United States Patent
Reddy et al.

(10) Patent No.: US 10,523,657 B2
(45) Date of Patent: Dec. 31, 2019

(54) ENDPOINT PRIVACY PRESERVATION WITH CLOUD CONFERENCING

(71) Applicant: Cisco Technology, Inc., San Jose, CA (US)

(72) Inventors: K Tirumaleswar Reddy, Bangalore (IN); Daniel G. Wing, San Jose, CA (US); Prashanth Patil, Mountain View, CA (US); Sandeep Rao, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 74 days.

(21) Appl. No.: 14/942,898

(22) Filed: Nov. 16, 2015

(65) Prior Publication Data

US 2017/0142096 A1 May 18, 2017

(51) Int. Cl.
*H04L 29/06* (2006.01)
*H04L 12/18* (2006.01)

(52) U.S. Cl.
CPC ...... *H04L 63/0823* (2013.01); *H04L 12/1813* (2013.01); *H04L 12/1827* (2013.01);
(Continued)

(58) Field of Classification Search
CPC ............ H04L 63/0823; H04L 63/0884; H04L 63/101; H04L 63/102; H04L 63/0421; H04L 65/403; H04L 12/1813
See application file for complete search history.

(56) References Cited

U.S. PATENT DOCUMENTS

| | | |
|---|---|---|
| 5,812,773 A | 9/1998 | Norin |
| 5,889,896 A | 3/1999 | Meshinsky et al. |

(Continued)

FOREIGN PATENT DOCUMENTS

| | | |
|---|---|---|
| CN | 101719930 | 6/2010 |
| CN | 101394360 | 7/2011 |

(Continued)

OTHER PUBLICATIONS

Author Unknown, "5 Benefits of a Storage Gateway in the Cloud," Blog, TwinStrata, Inc., Jul. 25, 2012, XP055141645, 4 pages, https://web.archive.org/web/20120725092619/http://blog.twinstrata.com/2012/07/10//5-benefits-of-a-storage-gateway-in-the-cloud.

(Continued)

*Primary Examiner* — Robert B Leung
(74) *Attorney, Agent, or Firm* — Polsinelli PC

(57) ABSTRACT

In one embodiment, a first request may be received from a first endpoint to access a cloud-based conference platform. The first request can include a first access token. Based at least on the first request, a first certificate may be provided to the first endpoint, wherein the first certificate may not include an identity of the first endpoint. A second request may be received from a second endpoint to access the cloud-based conference platform. The second request can include a second access token. Based at least on the second request, a second certificate can be provided to the second endpoint, wherein the second certificate may not include an identity of the second endpoint. Data can be routed within the cloud-based conference platform between the first endpoint and second endpoint based at least upon the first certificate and the second certificate.

20 Claims, 8 Drawing Sheets

(52) U.S. Cl.
CPC ...... *H04L 63/0414* (2013.01); *H04L 63/0421* (2013.01); *H04L 63/0884* (2013.01); *H04L 63/101* (2013.01); *H04L 65/1069* (2013.01); *H04L 65/1096* (2013.01); *H04L 65/403* (2013.01)

(56) References Cited

U.S. PATENT DOCUMENTS

| | | | |
|---|---|---|---|
| 6,108,782 A | 8/2000 | Fletcher et al. | |
| 6,178,453 B1 | 1/2001 | Mattaway et al. | |
| 6,298,153 B1* | 10/2001 | Oishi | G06F 21/606 |
| | | | 380/277 |
| 6,343,290 B1 | 1/2002 | Cossins et al. | |
| 6,643,260 B1 | 11/2003 | Kloth et al. | |
| 6,683,873 B1 | 1/2004 | Kwok et al. | |
| 6,721,804 B1 | 4/2004 | Rubin et al. | |
| 6,733,449 B1 | 5/2004 | Krishnamurthy et al. | |
| 6,735,631 B1 | 5/2004 | Oehrke et al. | |
| 6,885,670 B1 | 4/2005 | Regula | |
| 6,996,615 B1 | 2/2006 | McGuire | |
| 7,054,930 B1 | 5/2006 | Cheriton | |
| 7,058,706 B1 | 6/2006 | Iyer et al. | |
| 7,062,571 B1 | 6/2006 | Dale et al. | |
| 7,076,397 B2 | 7/2006 | Ding et al. | |
| 7,111,177 B1 | 9/2006 | Chauvel et al. | |
| 7,212,490 B1 | 5/2007 | Kao et al. | |
| 7,277,948 B2 | 10/2007 | Igarashi et al. | |
| 7,313,667 B1 | 12/2007 | Pullela et al. | |
| 7,379,846 B1 | 5/2008 | Williams et al. | |
| 7,480,672 B2 | 1/2009 | Hahn et al. | |
| 7,496,043 B1 | 2/2009 | Leong et al. | |
| 7,536,476 B1 | 5/2009 | Alleyne | |
| 7,567,504 B2 | 7/2009 | Darling et al. | |
| 7,606,147 B2 | 10/2009 | Luft et al. | |
| 7,647,594 B2 | 1/2010 | Togawa | |
| 7,684,322 B2 | 3/2010 | Sand et al. | |
| 7,773,510 B2 | 8/2010 | Back et al. | |
| 7,808,897 B1 | 10/2010 | Mehta et al. | |
| 7,881,957 B1 | 2/2011 | Cohen et al. | |
| 7,917,647 B2 | 3/2011 | Cooper et al. | |
| 8,010,598 B2 | 8/2011 | Tanimoto | |
| 8,028,071 B1 | 9/2011 | Mahalingam et al. | |
| 8,041,714 B2 | 10/2011 | Aymeloglu et al. | |
| 8,121,117 B1 | 2/2012 | Amdahl et al. | |
| 8,171,415 B2 | 5/2012 | Appleyard et al. | |
| 8,234,377 B2 | 7/2012 | Cohn | |
| 8,244,559 B2 | 8/2012 | Horvitz et al. | |
| 8,250,215 B2 | 8/2012 | Stienhans et al. | |
| 8,280,880 B1 | 10/2012 | Aymeloglu et al. | |
| 8,284,664 B1 | 10/2012 | Aybay et al. | |
| 8,284,776 B2 | 10/2012 | Petersen | |
| 8,301,746 B2 | 10/2012 | Head et al. | |
| 8,345,692 B2 | 1/2013 | Smith | |
| 8,406,141 B1 | 3/2013 | Couturier et al. | |
| 8,407,413 B1 | 3/2013 | Yucel et al. | |
| 8,448,171 B2 | 5/2013 | Donnellan et al. | |
| 8,477,610 B2 | 7/2013 | Zuo et al. | |
| 8,495,252 B2 | 7/2013 | Lais et al. | |
| 8,495,356 B2 | 7/2013 | Ashok et al. | |
| 8,510,469 B2 | 8/2013 | Portolani | |
| 8,514,868 B2 | 8/2013 | Hill | |
| 8,532,108 B2 | 9/2013 | Li et al. | |
| 8,533,687 B1 | 9/2013 | Greifeneder et al. | |
| 8,547,974 B1 | 10/2013 | Guruswamy et al. | |
| 8,560,639 B2 | 10/2013 | Murphy et al. | |
| 8,560,663 B2 | 10/2013 | Baucke et al. | |
| 8,589,543 B2 | 11/2013 | Dutta et al. | |
| 8,590,050 B2 | 11/2013 | Nagpal et al. | |
| 8,611,356 B2 | 12/2013 | Yu et al. | |
| 8,612,625 B2 | 12/2013 | Andreis et al. | |
| 8,630,291 B2 | 1/2014 | Shaffer et al. | |
| 8,639,787 B2 | 1/2014 | Lagergren et al. | |
| 8,656,024 B2 | 2/2014 | Krishnan et al. | |
| 8,660,129 B1 | 2/2014 | Brendel et al. | |
| 8,719,804 B2 | 5/2014 | Jain | |
| 8,775,576 B2 | 7/2014 | Hebert et al. | |
| 8,797,867 B1 | 8/2014 | Chen et al. | |
| 8,805,951 B1 | 8/2014 | Faibish et al. | |
| 8,850,182 B1 | 9/2014 | Fritz et al. | |
| 8,856,339 B2 | 10/2014 | Mestery et al. | |
| 8,909,780 B1 | 12/2014 | Dickinson et al. | |
| 8,909,928 B2 | 12/2014 | Ahmad et al. | |
| 8,918,510 B2 | 12/2014 | Gmach et al. | |
| 8,924,720 B2 | 12/2014 | Raghuram et al. | |
| 8,930,747 B2 | 1/2015 | Levijarvi et al. | |
| 8,938,775 B1 | 1/2015 | Roth et al. | |
| 8,959,526 B2 | 2/2015 | Kansal et al. | |
| 8,977,754 B2 | 3/2015 | Curry, Jr. et al. | |
| 9,009,697 B2 | 4/2015 | Breiter et al. | |
| 9,015,324 B2 | 4/2015 | Jackson | |
| 9,043,439 B2 | 5/2015 | Bicket et al. | |
| 9,049,115 B2 | 6/2015 | Rajendran et al. | |
| 9,063,789 B2 | 6/2015 | Beaty et al. | |
| 9,065,727 B1 | 6/2015 | Liu et al. | |
| 9,075,649 B1 | 7/2015 | Bushman et al. | |
| 9,104,334 B2 | 8/2015 | Madhusudana et al. | |
| 9,164,795 B1 | 10/2015 | Vincent | |
| 9,167,050 B2 | 10/2015 | Durazzo et al. | |
| 9,201,701 B2 | 12/2015 | Boldyrev et al. | |
| 9,201,704 B2 | 12/2015 | Chang et al. | |
| 9,203,784 B2 | 12/2015 | Chang et al. | |
| 9,223,634 B2 | 12/2015 | Chang et al. | |
| 9,244,776 B2 | 1/2016 | Koza et al. | |
| 9,251,114 B1 | 2/2016 | Ancin et al. | |
| 9,264,478 B2 | 2/2016 | Hon et al. | |
| 9,313,048 B2 | 4/2016 | Chang et al. | |
| 9,361,192 B2 | 6/2016 | Smith et al. | |
| 9,380,075 B2 | 6/2016 | He et al. | |
| 9,432,294 B2 | 8/2016 | Sharma et al. | |
| 9,444,744 B1 | 9/2016 | Sharma et al. | |
| 9,473,365 B2 | 10/2016 | Melander et al. | |
| 9,503,530 B1 | 11/2016 | Niedzielski | |
| 9,558,078 B2 | 1/2017 | Farlee et al. | |
| 9,613,078 B2 | 4/2017 | Vermeulen et al. | |
| 9,628,471 B1* | 4/2017 | Sundaram | H04L 63/083 |
| 9,632,858 B2 | 4/2017 | Sasturkar et al. | |
| 9,658,876 B2 | 5/2017 | Chang et al. | |
| 9,692,802 B2 | 6/2017 | Bicket et al. | |
| 9,727,359 B2 | 8/2017 | Tsirkin | |
| 9,736,063 B2 | 8/2017 | Wan et al. | |
| 9,755,858 B2 | 9/2017 | Bagepalli et al. | |
| 9,792,245 B2 | 10/2017 | Raghavan et al. | |
| 9,804,988 B1 | 10/2017 | Ayoub et al. | |
| 9,954,783 B1 | 4/2018 | Thirumurthi et al. | |
| 2002/0004900 A1* | 1/2002 | Patel | G06Q 30/02 |
| | | | 713/155 |
| 2002/0073337 A1 | 6/2002 | Ioele et al. | |
| 2002/0143928 A1 | 10/2002 | Maltz et al. | |
| 2002/0166117 A1 | 11/2002 | Abrams et al. | |
| 2002/0174216 A1 | 11/2002 | Shorey et al. | |
| 2003/0018591 A1 | 1/2003 | Komisky | |
| 2003/0056001 A1 | 3/2003 | Mate et al. | |
| 2003/0228585 A1 | 12/2003 | Inoko et al. | |
| 2004/0004941 A1 | 1/2004 | Malan et al. | |
| 2004/0095237 A1 | 5/2004 | Chen et al. | |
| 2004/0131059 A1 | 7/2004 | Ayyakad et al. | |
| 2004/0264481 A1 | 12/2004 | Darling et al. | |
| 2005/0060418 A1 | 3/2005 | Sorokopud | |
| 2005/0125424 A1 | 6/2005 | Herriott et al. | |
| 2006/0059558 A1 | 3/2006 | Selep et al. | |
| 2006/0104286 A1 | 5/2006 | Cheriton | |
| 2006/0120575 A1 | 6/2006 | Ahn et al. | |
| 2006/0126665 A1 | 6/2006 | Ward et al. | |
| 2006/0146825 A1 | 7/2006 | Hofstaedter et al. | |
| 2006/0155875 A1 | 7/2006 | Cheriton | |
| 2006/0168338 A1 | 7/2006 | Bruegl et al. | |
| 2006/0294207 A1 | 12/2006 | Barsness et al. | |
| 2007/0011330 A1 | 1/2007 | Dinker et al. | |
| 2007/0174663 A1 | 7/2007 | Crawford et al. | |
| 2007/0223487 A1 | 9/2007 | Kajekar et al. | |
| 2007/0242830 A1* | 10/2007 | Conrado | H04L 63/065 |
| | | | 380/285 |
| 2008/0005293 A1 | 1/2008 | Bhargava et al. | |
| 2008/0084880 A1 | 4/2008 | Dharwadkar | |

(56) References Cited

U.S. PATENT DOCUMENTS

| | | |
|---|---|---|
| 2008/0165778 A1 | 7/2008 | Ertemalp |
| 2008/0198752 A1 | 8/2008 | Fan et al. |
| 2008/0201711 A1 | 8/2008 | Amir Husain |
| 2008/0235755 A1 | 9/2008 | Blaisdell et al. |
| 2009/0006527 A1 | 1/2009 | Gingell, Jr. et al. |
| 2009/0010277 A1 | 1/2009 | Halbraich et al. |
| 2009/0019367 A1 | 1/2009 | Cavagnari et al. |
| 2009/0031312 A1 | 1/2009 | Mausolf et al. |
| 2009/0083183 A1* | 3/2009 | Rao .................. G06Q 10/10 705/50 |
| 2009/0138763 A1 | 5/2009 | Arnold |
| 2009/0177775 A1 | 7/2009 | Radia et al. |
| 2009/0178058 A1 | 7/2009 | Stillwell, III et al. |
| 2009/0182874 A1 | 7/2009 | Morford et al. |
| 2009/0265468 A1 | 10/2009 | Annambhotla et al. |
| 2009/0265753 A1* | 10/2009 | Anderson .......... H04L 63/0421 726/1 |
| 2009/0293056 A1 | 11/2009 | Ferris |
| 2009/0300608 A1 | 12/2009 | Ferris et al. |
| 2009/0313562 A1 | 12/2009 | Appleyard et al. |
| 2009/0323706 A1 | 12/2009 | Germain et al. |
| 2009/0328031 A1 | 12/2009 | Pouyadou et al. |
| 2010/0031025 A1* | 2/2010 | Zhang .................. H04L 63/0823 713/156 |
| 2010/0042720 A1 | 2/2010 | Stienhans et al. |
| 2010/0061250 A1 | 3/2010 | Nugent |
| 2010/0115341 A1 | 5/2010 | Baker et al. |
| 2010/0131765 A1* | 5/2010 | Bromley ............ H04L 63/0414 713/175 |
| 2010/0191783 A1 | 7/2010 | Mason et al. |
| 2010/0192157 A1 | 7/2010 | Jackson et al. |
| 2010/0205601 A1 | 8/2010 | Abbas et al. |
| 2010/0211782 A1 | 8/2010 | Auradkar et al. |
| 2010/0217886 A1 | 8/2010 | Seren et al. |
| 2010/0229241 A1* | 9/2010 | Liu .................... G06F 21/6254 726/26 |
| 2010/0293270 A1 | 11/2010 | Augenstein et al. |
| 2010/0318609 A1 | 12/2010 | Lahiri et al. |
| 2010/0325199 A1 | 12/2010 | Park et al. |
| 2010/0325257 A1 | 12/2010 | Goel et al. |
| 2010/0325441 A1* | 12/2010 | Laurie ................ G06F 21/31 713/185 |
| 2010/0333116 A1 | 12/2010 | Prahlad et al. |
| 2011/0016214 A1 | 1/2011 | Jackson |
| 2011/0035754 A1 | 2/2011 | Srinivasan |
| 2011/0055396 A1 | 3/2011 | Dehaan |
| 2011/0055398 A1 | 3/2011 | Dehaan et al. |
| 2011/0055470 A1 | 3/2011 | Portolani |
| 2011/0072489 A1 | 3/2011 | Parann-Nissany |
| 2011/0075667 A1 | 3/2011 | Li et al. |
| 2011/0110382 A1 | 5/2011 | Jabr et al. |
| 2011/0116443 A1 | 5/2011 | Yu et al. |
| 2011/0126099 A1 | 5/2011 | Anderson et al. |
| 2011/0138055 A1 | 6/2011 | Daly et al. |
| 2011/0145413 A1 | 6/2011 | Dawson et al. |
| 2011/0145657 A1 | 6/2011 | Bishop et al. |
| 2011/0173303 A1 | 7/2011 | Rider |
| 2011/0185063 A1 | 7/2011 | Head et al. |
| 2011/0199902 A1 | 8/2011 | Leavy et al. |
| 2011/0213687 A1 | 9/2011 | Ferris et al. |
| 2011/0213966 A1* | 9/2011 | Fu .................... H04L 63/0807 713/158 |
| 2011/0219434 A1 | 9/2011 | Betz et al. |
| 2011/0231715 A1 | 9/2011 | Kunii et al. |
| 2011/0231899 A1 | 9/2011 | Pulier et al. |
| 2011/0239039 A1 | 9/2011 | Dieffenbach et al. |
| 2011/0252327 A1 | 10/2011 | Awasthi et al. |
| 2011/0261811 A1 | 10/2011 | Battestilli et al. |
| 2011/0261828 A1 | 10/2011 | Smith |
| 2011/0276675 A1 | 11/2011 | Singh et al. |
| 2011/0276951 A1 | 11/2011 | Jain |
| 2011/0295998 A1 | 12/2011 | Ferris et al. |
| 2011/0305149 A1 | 12/2011 | Scott et al. |
| 2011/0307531 A1 | 12/2011 | Gaponenko et al. |
| 2011/0320870 A1 | 12/2011 | Kenigsberg et al. |
| 2012/0005724 A1 | 1/2012 | Lee |
| 2012/0023418 A1 | 1/2012 | Frields et al. |
| 2012/0054367 A1 | 3/2012 | Ramakrishnan et al. |
| 2012/0072318 A1 | 3/2012 | Akiyama et al. |
| 2012/0072578 A1 | 3/2012 | Alam |
| 2012/0072581 A1 | 3/2012 | Tung et al. |
| 2012/0072985 A1 | 3/2012 | Davne et al. |
| 2012/0072992 A1 | 3/2012 | Arasaratnam et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0102193 A1 | 4/2012 | Rathore et al. |
| 2012/0102199 A1 | 4/2012 | Hopmann et al. |
| 2012/0131174 A1 | 5/2012 | Ferris et al. |
| 2012/0137215 A1 | 5/2012 | Kawara |
| 2012/0158967 A1 | 6/2012 | Sedayao et al. |
| 2012/0159097 A1 | 6/2012 | Jennas, II et al. |
| 2012/0166649 A1 | 6/2012 | Watanabe et al. |
| 2012/0167094 A1 | 6/2012 | Suit |
| 2012/0173541 A1 | 7/2012 | Venkatarannani |
| 2012/0173710 A1 | 7/2012 | Rodriguez |
| 2012/0179909 A1 | 7/2012 | Sagi et al. |
| 2012/0180044 A1 | 7/2012 | Donnellan et al. |
| 2012/0182891 A1 | 7/2012 | Lee et al. |
| 2012/0185632 A1 | 7/2012 | Lais et al. |
| 2012/0185913 A1 | 7/2012 | Martinez et al. |
| 2012/0192016 A1 | 7/2012 | Gotesdyner et al. |
| 2012/0192075 A1 | 7/2012 | Ebtekar et al. |
| 2012/0201135 A1 | 8/2012 | Ding et al. |
| 2012/0203908 A1 | 8/2012 | Beaty et al. |
| 2012/0204169 A1 | 8/2012 | Breiter et al. |
| 2012/0204187 A1 | 8/2012 | Breiter et al. |
| 2012/0214506 A1 | 8/2012 | Skaaksrud et al. |
| 2012/0222106 A1 | 8/2012 | Kuehl |
| 2012/0236716 A1 | 9/2012 | Anbazhagan et al. |
| 2012/0240113 A1 | 9/2012 | Hur |
| 2012/0265976 A1 | 10/2012 | Spiers et al. |
| 2012/0272025 A1 | 10/2012 | Park et al. |
| 2012/0281706 A1 | 11/2012 | Agarwal et al. |
| 2012/0281708 A1 | 11/2012 | Chauhan et al. |
| 2012/0290647 A1 | 11/2012 | Ellison et al. |
| 2012/0297238 A1 | 11/2012 | Watson et al. |
| 2012/0311106 A1 | 12/2012 | Morgan |
| 2012/0311568 A1 | 12/2012 | Jansen |
| 2012/0324092 A1 | 12/2012 | Brown et al. |
| 2012/0324114 A1 | 12/2012 | Dutta et al. |
| 2013/0003567 A1 | 1/2013 | Gallant et al. |
| 2013/0013248 A1 | 1/2013 | Brugler et al. |
| 2013/0036213 A1 | 2/2013 | Hasan et al. |
| 2013/0044636 A1 | 2/2013 | Koponen et al. |
| 2013/0066940 A1 | 3/2013 | Shao |
| 2013/0069950 A1 | 3/2013 | Adam et al. |
| 2013/0080509 A1 | 3/2013 | Wang |
| 2013/0080624 A1 | 3/2013 | Nagai et al. |
| 2013/0091557 A1 | 4/2013 | Gurrapu |
| 2013/0097601 A1 | 4/2013 | Podvratnik et al. |
| 2013/0104140 A1 | 4/2013 | Meng et al. |
| 2013/0111540 A1 | 5/2013 | Sabin |
| 2013/0117337 A1 | 5/2013 | Dunham |
| 2013/0124628 A1* | 5/2013 | Weerasinghe ..... G06Q 30/0241 709/204 |
| 2013/0124712 A1 | 5/2013 | Parker |
| 2013/0125124 A1 | 5/2013 | Kempf et al. |
| 2013/0138816 A1 | 5/2013 | Kuo et al. |
| 2013/0144978 A1 | 6/2013 | Jain et al. |
| 2013/0152076 A1 | 6/2013 | Patel |
| 2013/0152175 A1 | 6/2013 | Hromoko et al. |
| 2013/0159097 A1 | 6/2013 | Schory et al. |
| 2013/0159496 A1 | 6/2013 | Hamilton et al. |
| 2013/0160008 A1 | 6/2013 | Cawlfield et al. |
| 2013/0162753 A1* | 6/2013 | Hendrickson ....... H04L 12/1818 348/14.08 |
| 2013/0169666 A1 | 7/2013 | Pacheco et al. |
| 2013/0179941 A1 | 7/2013 | McGloin et al. |
| 2013/0182712 A1 | 7/2013 | Aguayo et al. |
| 2013/0185413 A1 | 7/2013 | Beaty et al. |
| 2013/0185433 A1 | 7/2013 | Zhu et al. |
| 2013/0191106 A1 | 7/2013 | Kephart et al. |

(56) References Cited

U.S. PATENT DOCUMENTS

| | | |
|---|---|---|
| 2013/0198050 A1 | 8/2013 | Shroff et al. |
| 2013/0198374 A1 | 8/2013 | Zalmanovitch et al. |
| 2013/0204849 A1 | 8/2013 | Chacko |
| 2013/0232491 A1 | 9/2013 | Radhakrishnan et al. |
| 2013/0232492 A1 | 9/2013 | Wang |
| 2013/0246588 A1 | 9/2013 | Borowicz et al. |
| 2013/0250770 A1 | 9/2013 | Zou et al. |
| 2013/0254415 A1 | 9/2013 | Fullen et al. |
| 2013/0262347 A1 | 10/2013 | Dodson |
| 2013/0283364 A1 | 10/2013 | Chang et al. |
| 2013/0297769 A1 | 11/2013 | Chang et al. |
| 2013/0318240 A1 | 11/2013 | Hebert et al. |
| 2013/0318546 A1 | 11/2013 | Kothuri et al. |
| 2013/0339949 A1 | 12/2013 | Spiers et al. |
| 2014/0006481 A1 | 1/2014 | Frey et al. |
| 2014/0006535 A1 | 1/2014 | Reddy |
| 2014/0006585 A1 | 1/2014 | Dunbar et al. |
| 2014/0019639 A1 | 1/2014 | Ueno |
| 2014/0040473 A1 | 2/2014 | Ho et al. |
| 2014/0040883 A1 | 2/2014 | Tompkins |
| 2014/0052877 A1 | 2/2014 | Mao |
| 2014/0059310 A1 | 2/2014 | Du et al. |
| 2014/0074850 A1 | 3/2014 | Noel et al. |
| 2014/0075048 A1 | 3/2014 | Yuksel et al. |
| 2014/0075108 A1 | 3/2014 | Dong et al. |
| 2014/0075357 A1 | 3/2014 | Flores et al. |
| 2014/0075501 A1 | 3/2014 | Srinivasan et al. |
| 2014/0089727 A1 | 3/2014 | Cherkasova et al. |
| 2014/0098762 A1 | 4/2014 | Ghai et al. |
| 2014/0108985 A1 | 4/2014 | Scott et al. |
| 2014/0122560 A1 | 5/2014 | Ramey et al. |
| 2014/0136779 A1 | 5/2014 | Guha et al. |
| 2014/0140211 A1 | 5/2014 | Chandrasekaran et al. |
| 2014/0141720 A1* | 5/2014 | Princen ............... H04L 63/0407 455/41.2 |
| 2014/0156557 A1 | 6/2014 | Zeng et al. |
| 2014/0160924 A1 | 6/2014 | Pfautz et al. |
| 2014/0164486 A1 | 6/2014 | Ravichandran et al. |
| 2014/0188825 A1 | 7/2014 | Muthukkaruppan et al. |
| 2014/0189095 A1 | 7/2014 | Lindberg et al. |
| 2014/0189125 A1 | 7/2014 | Amies et al. |
| 2014/0215471 A1 | 7/2014 | Cherkasova |
| 2014/0222953 A1 | 8/2014 | Karve et al. |
| 2014/0244851 A1 | 8/2014 | Lee |
| 2014/0245298 A1 | 8/2014 | Zhou et al. |
| 2014/0269266 A1 | 9/2014 | Filsfils et al. |
| 2014/0280805 A1 | 9/2014 | Sawalha |
| 2014/0282536 A1 | 9/2014 | Dave et al. |
| 2014/0282611 A1 | 9/2014 | Campbell et al. |
| 2014/0282669 A1 | 9/2014 | McMillan |
| 2014/0282889 A1 | 9/2014 | Ishaya et al. |
| 2014/0289200 A1 | 9/2014 | Kato |
| 2014/0297569 A1 | 10/2014 | Clark et al. |
| 2014/0297835 A1 | 10/2014 | Buys |
| 2014/0314078 A1 | 10/2014 | Jilani |
| 2014/0317261 A1 | 10/2014 | Shatzkamer et al. |
| 2014/0366155 A1 | 12/2014 | Chang et al. |
| 2014/0372567 A1 | 12/2014 | Ganesh et al. |
| 2015/0006470 A1 | 1/2015 | Mohan |
| 2015/0033086 A1 | 1/2015 | Sasturkar et al. |
| 2015/0043335 A1 | 2/2015 | Testicioglu et al. |
| 2015/0043576 A1 | 2/2015 | Dixon et al. |
| 2015/0052247 A1 | 2/2015 | Threefoot et al. |
| 2015/0052517 A1 | 2/2015 | Raghu et al. |
| 2015/0058382 A1 | 2/2015 | St. Laurent et al. |
| 2015/0058459 A1 | 2/2015 | Amendjian et al. |
| 2015/0058557 A1 | 2/2015 | Madhusudana et al. |
| 2015/0070516 A1 | 3/2015 | Shoemake et al. |
| 2015/0071285 A1 | 3/2015 | Kumar et al. |
| 2015/0089478 A1 | 3/2015 | Cheluvaraju et al. |
| 2015/0100471 A1 | 4/2015 | Curry, Jr. et al. |
| 2015/0106802 A1 | 4/2015 | Ivanov et al. |
| 2015/0106805 A1 | 4/2015 | Melander et al. |
| 2015/0109923 A1 | 4/2015 | Hwang |
| 2015/0117199 A1 | 4/2015 | Chinnaiah Sankaran et al. |
| 2015/0117458 A1 | 4/2015 | Gurkan et al. |
| 2015/0120914 A1 | 4/2015 | Wada et al. |
| 2015/0149828 A1 | 5/2015 | Mukerji et al. |
| 2015/0178133 A1 | 6/2015 | Phelan et al. |
| 2015/0215819 A1 | 7/2015 | Bosch et al. |
| 2015/0227405 A1 | 8/2015 | Jan et al. |
| 2015/0242204 A1 | 8/2015 | Hassine et al. |
| 2015/0249709 A1 | 9/2015 | Teng et al. |
| 2015/0271199 A1 | 9/2015 | Bradley et al. |
| 2015/0280980 A1 | 10/2015 | Bitar |
| 2015/0281067 A1 | 10/2015 | Wu |
| 2015/0281113 A1 | 10/2015 | Siciliano et al. |
| 2015/0309908 A1 | 10/2015 | Pearson et al. |
| 2015/0319063 A1 | 11/2015 | Zourzouvillys et al. |
| 2015/0326524 A1 | 11/2015 | Tankala et al. |
| 2015/0339210 A1 | 11/2015 | Kopp et al. |
| 2015/0373108 A1 | 12/2015 | Fleming et al. |
| 2015/0379062 A1 | 12/2015 | Vermeulen et al. |
| 2016/0011925 A1 | 1/2016 | Kulkarni et al. |
| 2016/0013990 A1 | 1/2016 | Kulkarni et al. |
| 2016/0062786 A1 | 3/2016 | Meng et al. |
| 2016/0065417 A1 | 3/2016 | Sapuram et al. |
| 2016/0094398 A1 | 3/2016 | Choudhury et al. |
| 2016/0094480 A1 | 3/2016 | Kulkarni et al. |
| 2016/0094643 A1 | 3/2016 | Jain et al. |
| 2016/0094894 A1 | 3/2016 | Inayatullah et al. |
| 2016/0099847 A1 | 4/2016 | Melander et al. |
| 2016/0099873 A1 | 4/2016 | Gerö et al. |
| 2016/0103838 A1 | 4/2016 | Sainani et al. |
| 2016/0105393 A1 | 4/2016 | Thakkar et al. |
| 2016/0127184 A1 | 5/2016 | Bursell |
| 2016/0134557 A1 | 5/2016 | Steinder et al. |
| 2016/0147676 A1 | 5/2016 | Cha et al. |
| 2016/0162436 A1 | 6/2016 | Raghavan et al. |
| 2016/0164914 A1 | 6/2016 | Madhav et al. |
| 2016/0188527 A1 | 6/2016 | Cherian et al. |
| 2016/0234071 A1 | 8/2016 | Nambiar et al. |
| 2016/0239399 A1 | 8/2016 | Babu et al. |
| 2016/0253078 A1 | 9/2016 | Ebtekar et al. |
| 2016/0254968 A1 | 9/2016 | Ebtekar et al. |
| 2016/0261564 A1 | 9/2016 | Foxhoven et al. |
| 2016/0277368 A1 | 9/2016 | Narayanaswamy et al. |
| 2016/0292611 A1 | 10/2016 | Boe et al. |
| 2016/0352682 A1 | 12/2016 | Chang |
| 2016/0378389 A1 | 12/2016 | Hrischuk et al. |
| 2017/0005948 A1 | 1/2017 | Melander et al. |
| 2017/0024260 A1 | 1/2017 | Chandrasekaran et al. |
| 2017/0026470 A1 | 1/2017 | Bhargava et al. |
| 2017/0034199 A1 | 2/2017 | Zaw |
| 2017/0041342 A1 | 2/2017 | Efremov et al. |
| 2017/0054659 A1 | 2/2017 | Ergin et al. |
| 2017/0063674 A1 | 3/2017 | Maskalik et al. |
| 2017/0097841 A1 | 4/2017 | Chang et al. |
| 2017/0099188 A1 | 4/2017 | Chang et al. |
| 2017/0104755 A1 | 4/2017 | Arregoces et al. |
| 2017/0126583 A1 | 5/2017 | Xia |
| 2017/0147297 A1 | 5/2017 | Krishnamurthy et al. |
| 2017/0163569 A1 | 6/2017 | Koganti |
| 2017/0171158 A1 | 6/2017 | Hoy et al. |
| 2017/0192823 A1 | 7/2017 | Karaje et al. |
| 2017/0264663 A1 | 9/2017 | Bicket et al. |
| 2017/0302521 A1 | 10/2017 | Lui et al. |
| 2017/0310556 A1 | 10/2017 | Knowles et al. |
| 2017/0317932 A1 | 11/2017 | Paramasivam |
| 2017/0339070 A1 | 11/2017 | Chang et al. |
| 2018/0069885 A1 | 3/2018 | Patterson et al. |
| 2018/0173372 A1 | 6/2018 | Greenspan et al. |
| 2018/0174060 A1 | 6/2018 | Velez-Rojas et al. |

FOREIGN PATENT DOCUMENTS

| | | |
|---|---|---|
| CN | 102164091 | 8/2011 |
| CN | 102918499 | 2/2013 |
| CN | 104320342 | 1/2015 |
| CN | 105740084 | 7/2016 |
| EP | 2228719 | 9/2010 |
| EP | 2439637 | 4/2012 |
| EP | 2645253 | 11/2014 |
| KR | 10-2015-0070676 | 5/2015 |

(56) References Cited

FOREIGN PATENT DOCUMENTS

| TW | M394537 | 12/2010 |
|---|---|---|
| WO | WO 2009/155574 | 12/2009 |
| WO | WO 2010/030915 | 3/2010 |
| WO | WO 2013/158707 | 10/2013 |

OTHER PUBLICATIONS

Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.
Author Unknown, "Open Data Center Alliance Usage: Virtual Machine (VM) Interoperability in a Hybrid Cloud Environment Rev. 1.2," Open Data Center Alliance, Inc., 2013, 18 pages.
Author Unknown, "Real-Time Performance Monitoring on Juniper Networks Devices, Tips and Tools for Assessing and Analyzing Network Efficiency," Juniper Networks, Inc., May 2010, 35 pages.
Beyer, Steffen, "Module 'Data::Locations?!'," YAPC::Europe, London, UK,ICA, Sep. 22-24, 2000, XP002742700, 15 pages.
Borovick, Lucinda, et al., "Architecting the Network for the Cloud," IDC White Paper, Jan. 2011, 8 pages.
Bosch, Greg, "Virtualization," last modified Apr. 2012 by B. Davison, 33 pages.
Broadcasters Audience Research Board, "What's Next," http://lwww.barb.co.uk/whats-next, accessed Jul. 22, 2015, 2 pages.
Cisco Systems, Inc. "Best Practices in Deploying Cisco Nexus 1000V Series Switches on Cisco UCS B and C Series Cisco UCS Manager Servers," Cisco White Paper, Apr. 2011, 36 pages, http://www.cisco.com/en/US/prod/collateral/switches/ps9441/ps9902/white_paper_c11-558242.pdf.
Cisco Systems, Inc., "Cisco Unified Network Services: Overcome Obstacles to Cloud-Ready Deployments," Cisco White Paper, Jan. 2011, 6 pages.
Cisco Systems, Inc., "Cisco Intercloud Fabric: Hybrid Cloud with Choice, Consistency, Control and Compliance," Dec. 10, 2014, 22 pages.
Cisco Technology, Inc., "Cisco Expands Videoscape TV Platform Into the Cloud," Jan. 6, 2014, Las Vegas, Nevada, Press Release, 3 pages.
CSS Corp, "Enterprise Cloud Gateway (ECG)—Policy driven framework for managing multi-cloud environments," original published on or about Feb. 11, 2012; 1 page; http://www.css-cloud.com/platform/enterprise-cloud-pateway.php.
Fang K., "LISP MAC-EID-TO-RLOC Mapping (LISP based L2VPN)," Network Working Group, Internet Draft, CISCO Systems, Jan. 2012, 12 pages.
Herry, William, "Keep It Simple, Stupid: OpenStack nova-scheduler and its algorithm", May 12, 2012, IBM, 12 pages.
Hewlett-Packard Company, "Virtual context management on network devices", Research Disclosure, vol. 564, No. 60, Apr. 1, 2011, Mason Publications, Hampshire, GB, Apr. 1, 2011, 524.
Juniper Networks, Inc., "Recreating Real Application Traffic in Junosphere Lab," Solution Brief, Dec. 2011, 3 pages.
Kenhui, "Musings on Cloud Computing and IT-as-a-Service: [Updated for Havana] Openstack Computer for VSphere Admins, Part 2: Nova-Scheduler and DRS", Jun. 26, 2013, Cloud Architect Musings, 12 pages.
Kolyshkin, Kirill, "Virtualization in Linux," Sep. 1, 2006, XP055141648, 5 pages, https://web.archive.org/web/20070120205111/http://download.openvz.org/doc/openvz-intro.pdf.
Lerach, S.R.O., "Golem," http://www.lerach.cz/en/products/golem, accessed Jul. 22, 2015, 2 pages.
Linthicum, David, "VM Import could be a game changer for hybrid clouds", InfoWorld, Dec. 23, 2010, 4 pages.
Naik, Vijay K., et al., "Harmony: A Desktop Grid for Delivering Enterprise Computations," Grid Computing, 2003, Fourth International Workshop on Proceedings, Nov. 17, 2003, pp. 1-11.
Nair, Srijith K. et al., "Towards Secure Cloud Bursting, Brokerage and Aggregation," 2012, 8 pages, www.flexiant.com.
Nielsen, "SimMetry Audience Measurement—Technology," http://www.nielsen-admosphere.eu/products-and-services/simmetrv-audience-measurement-technology/, accessed Jul. 22, 2015, 6 pages.
Nielsen, "Television " http://www.nielsen.com/us/en/solutions/measurement/television.html, accessed Jul. 22, 2015, 4 pages.
Open Stack, "Filter Scheduler," updated Dec. 17, 2017, 5 pages, accessed on Dec. 18, 2017, https://docs.openstack.org/nova/latest/user/filter-scheduler.html.
Rabadan, J., et al., "Operational Aspects of Proxy-ARP/ND in EVPN Networks," BESS Worksgroup Internet Draft, draft-snr-bess-evpn-proxy-arp-nd-02, Oct. 6, 2015, 22 pages.
Saidi, Ali, et al., "Performance Validation of Network-Intensive Workloads on a Full-System Simulator," Interaction between Operating System and Computer Architecture Workshop, (IOSCA 2005), Austin, Texas, Oct. 2005, 10 pages.
Shunra, "Shunra for HP Software; Enabling Confidence in Application Performance Before Deployment," 2010, 2 pages.
Son, Jungmin, "Automatic decision system for efficient resource selection and allocation in inter-clouds," Jun. 2013, 35 pages.
Wikipedia, "Filter (software)", Wikipedia, Feb. 8, 2014, 2 pages, https://en.wikipedia.org/w/index.php?title=Filter %28software%29&oldid=594544359.
Wikipedia; "Pipeline (Unix)", Wikipedia, May 4, 2014, 4 pages, https://en.wikipedia.org/w/index.php?title=Pipeline2/028Unix%29&oldid=606980114.
Al-Harbi, S.H., et al., "Adapting k-means for supervised clustering," Jun. 2006, Applied Intelligence, vol. 24, Issue 3, pp. 219-226.
Amedro, Brian, et al., "An Efficient Framework for Running Applications on Clusters, Grids and Cloud," 2010, 17 pages.
Author Unknown, "A Look at DeltaCloud: The Multi-Cloud API," Feb. 17, 2012, 4 pages.
Author Unknown, "About Deltacloud," Apache Software Foundation, Aug. 18, 2013, 1 page.
Author Unknown, "Architecture for Managing Clouds, A White Paper from the Open Cloud Standards Incubator," Version 1.0.0, Document No. DSP-IS0102, Jun. 18, 2010, 57 pages.
Author Unknown, "Cloud Infrastructure Management Interface—Common Information Model (CIMI-CIM)," Document No. DSP0264, Version 1.0.0, Dec. 14, 2012, 21 pages.
Author Unknown, "Cloud Infrastructure Management Interface (CIMI) Primer," Document No. DSP2027, Version 1.0.1, Sep. 12, 2012, 30 pages.
Author Unknown, "cloudControl Documentation," Aug. 25, 2013, 14 pages.
Author Unknown, "Interoperable Clouds, A White Paper from the Open Cloud Standards Incubator," Version 1.0.0, Document No. DSP-IS0101, Nov. 11, 2009, 21 pages.
Author Unknown, "Microsoft Cloud Edge Gateway (MCE) Series Appliance," Iron Networks, Inc., 2014, 4 pages.
Author Unknown, "Use Cases and Interactions for Managing Clouds, A White Paper from the Open Cloud Standards Incubator," Version 1.0.0, Document No. DSP-ISO0103, Jun. 16, 2010, 75 pages.
Author Unknown, "Apache Ambari Meetup What's New," Hortonworks Inc., Sep. 2013, 28 pages.
Author Unknown, "Introduction," Apache Ambari project, Apache Software Foundation, 2014, 1 page.
Bohner, Shawn A., "Extending Software Change Impact Analysis into COTS Components," 2003, IEEE, 8 pages.
Citrix, "Citrix StoreFront 2.0" White Paper, Proof of Concept Implementation Guide, Citrix Systems, Inc., 2013, 48 pages.
Citrix, "Deployment Practices and Guidelines for NetScaler 10.5 on Amazon Web Services," White Paper, citrix.com, 2014, 14 pages.
Gedymin, Adam, "Cloud Computing with an emphasis on Google App Engine," Sep. 2011, 146 pages.
Good, Nathan A., "Use Apache Deltacloud to administer multiple instances with a single API," Dec. 17, 2012, 7 pages.
Hood, C. S., et al., "Automated Proactive Anomaly Detection," 1997, Springer Science and Business Media Dordrecht , pp. 688-699.
Kunz, Thomas, et al., "OmniCloud—The Secure and Flexible Use of Cloud Storage Services," 2014, 30 pages.

(56) References Cited

OTHER PUBLICATIONS

Logan, Marcus, "Hybrid Cloud Application Architecture for Elastic Java-Based Web Applications," F5 Deployment Guide Version 1.1, 2016, 65 pages.

Lynch, Sean, "Monitoring cache with Claspin" Facebook Engineering, Sep. 19, 2012, 5 pages.

Meireles, Fernando Miguel Dias, "Integrated Management of Cloud Computing Resources," 2013-2014, 286 pages.

Mu, Shuai, et al., "uLibCloud: Providing High Available and Uniform Accessing to Multiple Cloud Storages," 2012 IEEE, 8 pages.

Sun, Aobing, et al., "IaaS Public Cloud Computing Platform Scheduling Model and Optimization Analysis," Int. J. Communications, Network and System Sciences, 2011, 4, 803-811, 9 pages.

Szymaniak, Michal, et al., "Latency-Driven Replica Placement", vol. 47 No. 8, IPSJ Journal, Aug. 2006, 12 pages.

Toews, Everett, "Introduction to Apache jclouds," Apr. 7, 2014, 23 pages.

Vilalta R., et al., "An efficient approach to external cluster assessment with an application to martian topography," Feb. 2007, 23 pages, Data Mining and Knowledge Discovery 14.1: 1-23. New York: Springer Science & Business Media.

Von Laszewski, Gregor, et al., "Design of a Dynamic Provisioning System for a Federated Cloud and Bare-metal Environment," 2012, 8 pages.

Ye, Xianglong, et al., "A Novel Blocks Placement Strategy for Hadoop," 2012 IEEE/ACTS 11th International Conference on Computer and Information Science, 2012 IEEE, 5 pages.

\* cited by examiner

ENDPOINT PRIVACY PRESERVATION WITH CLOUD CONFERENCING

TECHNICAL FIELD

The present technology pertains to computer-based networking, and more specifically to privacy preservation in a cloud-based networking environment.

BACKGROUND

As more enterprises and private consumers shift toward cloud-based networking for communication and data manipulation, challenges arise due to an increasing amount of bad parties seeking to access, without authorization, information stored in cloud-based networks. Such information may include sensitive data being shared such as work-related documents or the names of the parties communicating with each other and the organizations/enterprises that the parties belong to. Parties communicating via a cloud-based network may not want unauthorized parties to know their identities due to privacy concerns. This may be due to the fact that inferences can be made if an unauthorized party is aware of the identities of parties in communication with each other via a cloud-based network. Such inferences may be reinforced when data regarding the amount and duration of communications between the parties is known in addition to the identities of the parties.

BRIEF DESCRIPTION OF THE DRAWINGS

In order to describe the manner in which the above-recited features and other advantages of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting its scope, the principles herein are described and explained with additional specificity and detail through the use of the accompanying drawings in which.

A component or a feature that is common to more than one drawing is indicated with the same reference number in each of the drawings.

DESCRIPTION OF EXAMPLE EMBODIMENTS

Figure 1:
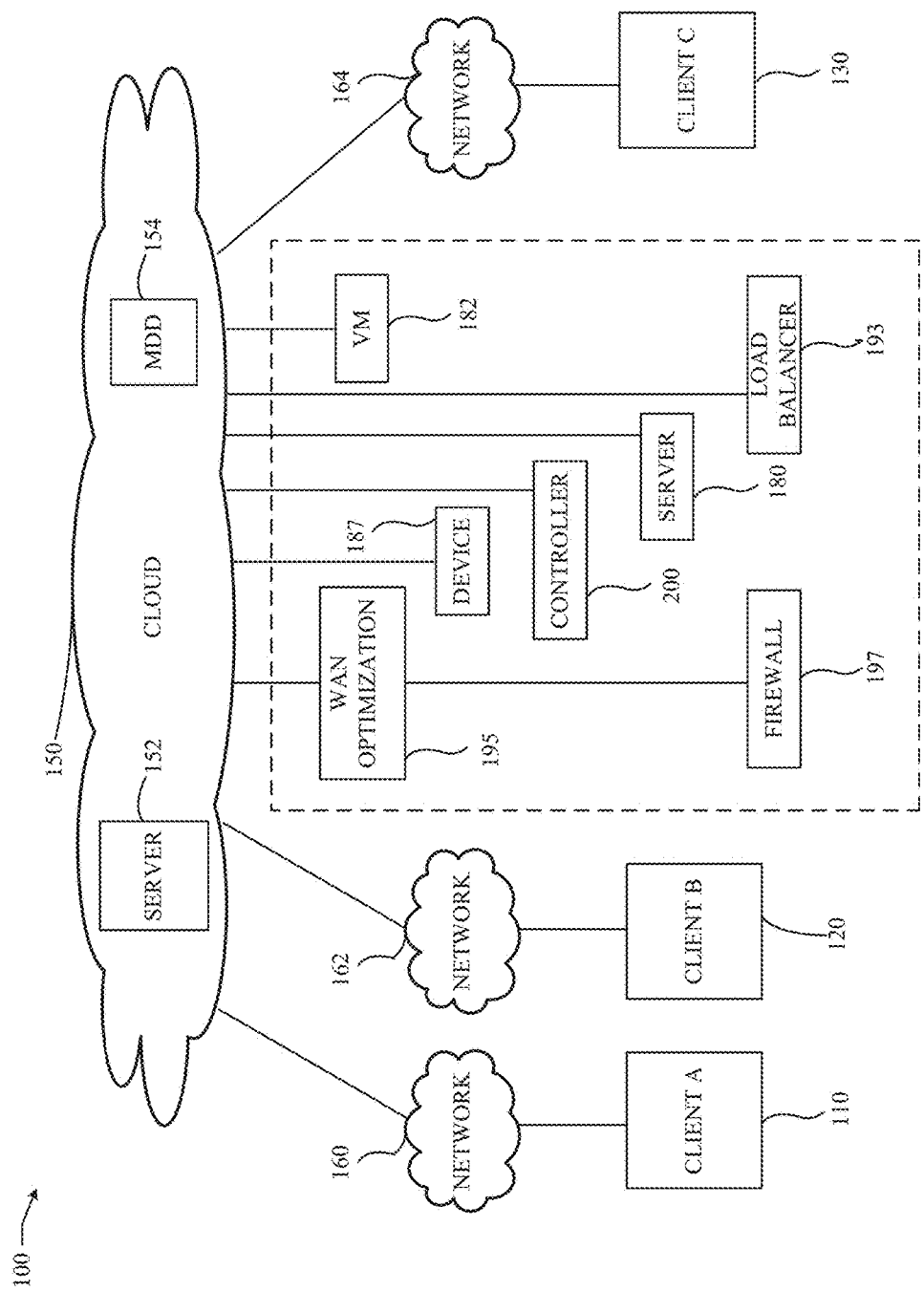
FIG. 1 illustrates an example cloud architecture including nodes and devices interconnected by various methods of communication.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

In some embodiments, a first request may be received from a first endpoint to access a cloud-based conference platform. The first request can include a first access token that does not include an identity of the first endpoint. A second request may be received from a second endpoint to access the cloud-based conference platform. The second request can include a second access token that does not include an identity of the second endpoint. Data can be routed within the cloud-based conference platform between the first endpoint and second endpoint based at least upon the first certificate and the second certificate. These and other features are disclosed in greater detail below.

Description

Some embodiments of the present technology can hide the identities of endpoints (for example, call participants) in a conference call using the cloud conference server while still allowing endpoints to exchange media (for example, voice/data/video) through the media distribution device (MDD) provided by the cloud conference service. The participating endpoints can also be made aware of the identities of the other participating endpoints on the conference call. This may be accomplished, in some embodiments, by utilizing an authorization server to act as an intermediary to determine whether endpoints/call participants of an intended conference call conducted via a cloud conference server are authorized to participate in the conference call. The authorization server may provide keys (for instance, encrypted keys) to the endpoints for verification that the endpoints may access the conference call. In some embodiments, the authorization server can be the Enterprise identity provider (IdP) to generate a certificate/token for an endpoint which is trying to establish its identity (may be referred to as an authenticating party or authenticating endpoint) to access to the cloud conference server, wherein the certificate may conceal the identity of the endpoint call participant. The authenticating party/authenticating endpoint may also inform the identity provider about the identities of other participants in the conference call authorized to receive the identity of the authenticating party.

Assertion verification can be a process by which a relying party can verify that an assertion of a user's ownership of a certain credential/certificate is valid. In some embodiments, an IdP can provide a short-term certificate (e.g., single use) such that an ownership assertion needs to be changed for each request (e.g., each call) to access a cloud conferencing server so that the cloud conferencing server cannot identify that the same endpoint is making multiple calls.

Endpoints may use a third party authorization service (for example, OAuth 2.0) to gain access to a cloud conferencing server. In some embodiments, an Enterprise identity provider can perform the role of authorization server and the cloud conferencing server can perform the role of resource server. Endpoints may authenticate with the authorization server/Enterprise identity provider in order to receive an access token from the authorization server/Enterprise identity provider. The endpoints can then utilize the access token to receive authorization to access the cloud conferencing server and MDD. Thus, some embodiments provide that the endpoints do not make their true identities known to the cloud conferencing server.

In some embodiments, an IdP proxy can mask the true identities of authenticating parties/endpoints during identity assertion generation, which may be exchanged using an offer/answer process. The IdP proxy can be implemented with a script (e.g., JavaScript®) that runs in an isolated security context within a network and communicates via a secure message passing channel. Identity assertion generation may be followed by identity assertion validation/verification, which can be performed by the IdP proxy. In some embodiments, the identity assertion generated by the IdP proxy may not include the true identity of the authenticating party. Participants of the conference call can receive the true identity of the authenticating party, but identity assertion validation/verification performed by the MDD may not receive the true identity of the authenticating party since the MDD may not be authorized by the authenticating party to receive the true identity.

In some embodiments, a web browser may instantiate an IdP proxy. This may allow the IdP to load any script necessary into the IdP proxy. The resulting code may run in the IdP's security context. The IdP can register an object with the browser that conforms to a corresponding application program interface (API). The web browser may invoke methods on the object registered by the IdP proxy to generate or verify/validate identity assertions.

Endpoint identities or true identities may refer to the identities of each individual participant and/or the identities of the organizations associated with the endpoints/call participants. Some embodiments of the present technology may hide the identities of the individual call participants/endpoints from the cloud conferencing server while some embodiments may hide both the identities of the individual call participants and the identities of the organizations associated with the call participants. This would, among other things, improve privacy among call participants because outside parties would not be able to make inferences based on tracked call sessions made in the cloud conference server.

For instance, a call session facilitated by a cloud conferencing server could be targeted to gain information which would be valuable to businesses competing with the participants of a call session. If the true identities of the call session participants are discovered by an unauthorized third party, the unauthorized third party could use the information to make inferences regarding the nature of the call session. For example, an unauthorized third party could infer that the endpoint parties of the call session are conducting business deals or negotiations. This information could be valuable to an unauthorized third party as it may allow the unauthorized third party to gain an unfair business advantage over its competitors by having information that was intended to be confidential. Thus, privacy concerns may dictate a need for concealment of endpoint identities in a cloud conferencing server environment.

In some embodiments, a decentralized key distribution method can include a first conference call participant (for example, a speaker in the conference call) who establishes a secure connection with other conference call participants. The conference call participants can authenticate individually with an authentication server in order to receive a certificate/token for access to the conference call hosted by a cloud conference server. The initiating participant may request from the authentication server an encrypted key/token/group identifier for distribution to the group of conference call participants in order to exchange media. In some embodiments, the cloud conference server cannot access the encrypted media exchanged between participants and does not know the identity of the participants, but can modify the Real-time Transport Protocol (RTP) header.

In some embodiments, a centralized key distribution method can include an on-premise Enterprise Key Management Server (KMS), which may act as an intermediary/proxy authorization server. Endpoint participants of a conference call can authenticate with the KMS, and the initiating endpoint participant may request a group identifier/encryption key from the KMS in order for the conference call participants to communicate with each other while utilizing the cloud conference server. The KMS may provide the identities of conference call participants to other conference call participants authorized to receive the information.

In some embodiments, the present technology can be utilized in a cloud computing environment. For example, an exemplary cloud or virtual computing environment is provided in FIG. 1. FIG. 1 illustrates an example cloud architecture 100 including nodes and devices interconnected by various methods of communication. Cloud 150 can be a public, private, and/or hybrid cloud system which may include one or more public and private cloud networks in communication with each other. Cloud 150 can include resources, such as a cloud conferencing server 152; MDD 154; one or more Firewalls 197; Load Balancers 193; WAN optimization platforms 195; devices 187, such as switches, routers, intrusion detection systems, Auto VPN systems, or any hardware or software network device; one or more servers 180, such as a primary use network server, a data backup server, dynamic host configuration protocol (DHCP), domain naming system (DNS), or storage servers; virtual machines (VMs) 190; controllers, such as a communications controller 200 or a management device.

MDD 154 can forward media flows transmitted by conference call participants to other conference call participants, and may sometimes forward only a subset of flows based on voice activity detection or other criteria. In some embodiments, a switching MDD 154 may make limited modifications to RTP [RFC3550] headers, for example, but the actual media content (e.g., voice or video data) can be unaltered. An advantage of switched conferencing is that MDD 154 can be deployed on general-purpose computing hardware. This, in turn, means that it is possible to deploy a switching MDD 154 in virtualized environments, including private and public clouds.

Cloud resources can be physical, software, virtual, or any combination thereof. For example, a cloud resource can include a server running one or more VMs or storing one or more databases. Moreover, cloud resources can be provisioned based on requests (e.g., client or tenant requests), schedules, triggers, events, signals, messages, alerts, agreements, necessity, or any other factor. For example, cloud 150 can provision network recovery services, application services, software development services, database services, storage services, management services, monitoring services, configuration services, administration services, backup services, disaster recovery services, bandwidth or performance services, intrusion detection services, VPN services, or any type of services to any device, server, network, client, or tenant.

In addition, cloud 150 can handle traffic and/or provision services. For example, cloud 150 can provide network routing/re-routing services, network data backup services, configuration services, such as auto VPN, automated deployments, automated wireless configurations, automated policy implementations, and the like. In some embodiments, the cloud 150 can collect data about a client or network and generate configuration settings for specific service, device, or networking deployments. For example, the cloud 150 can generate security policies, subnetting and routing schemes, forwarding schemes, NAT settings, VPN settings, and/or any other type of configurations. The cloud 150 can then push or transmit the necessary data and settings to specific devices or components to manage a specific implementation or deployment. For example, the cloud 150 can generate VPN settings, such as IP mappings, port number, and security information, and send the VPN settings to specific, relevant device(s) or component(s) identified by the cloud 150 or otherwise designated. The relevant device(s) or component(s) can then use the VPN settings to establish a VPN tunnel according to the settings. As another example, the cloud 150 can generate and manage network diagnostic tools or graphical user interfaces.

Furthermore, cloud 150 can provide specific services for clients—namely, client A 110, client B 120, and client C 130. For example, cloud 150 can deploy a network or specific network components, configure links or devices, automate services or functions, or provide any other services for the clients. Other non-limiting example services performable by cloud 150 can include network administration services, network monitoring services, content filtering services, application control, WAN optimization, firewall services, gateway services, storage services, protocol configuration services, wireless deployment services, and so forth.

To this end, the clients can connect with cloud 150 through networks 160, 162, and 164, respectively. More specifically, client A 110, client B 120, and client C 130 can each connect with cloud 150 through networks 160, 162, and 164, respectively, in order to access resources from cloud 150, communicate with cloud 150, or receive any services from cloud 150. Networks 160, 162, and 164 can each refer to a public network, such as the Internet; a private network, such as a LAN; a combination of networks; or any other network, such as a VPN or an overlay network.

Moreover, the clients can each include one or more networks. For example, client A 110, client B 120, and client C 130 can each include one or more LANs and VLANs. In some cases, a client can represent one branch network, such as a LAN, or multiple branch networks, such as multiple remote networks. For example, client A 110 can represent a single LAN network or branch, or multiple branches or networks, such as a branch building or office network in Los Angeles and another branch building or office network in New York. If a client includes multiple branches or networks, the multiple branches or networks can each have a designated connection to the cloud 150. For example, each branch or network can maintain a tunnel to the cloud 150. Alternatively, all branches or networks for a specific client can connect to the cloud 150 via one or more specific branches or networks. For example, traffic for the different branches or networks of a client can be routed through one or more specific branches or networks. Further, client A 110, client B 120, and client C 130 can each include one or more routers, switches, appliances, client devices, VMs, or any other devices.

Each client can also maintain links between branches. For example, client A can have two branches, and the branches can maintain a link between each other. Thus, in some cases, branches can maintain a tunnel between each other, such as a VPN tunnel. Moreover, the link or tunnel between branches can be generated and/or maintained by the cloud 150. For example, the cloud 150 can collect network and address settings for each branch and use those settings to establish a tunnel between branches. In some cases, the branches can use a respective tunnel between the respective branch and the cloud 150 to establish the tunnel between branches. For example, branch 1 can communicate with cloud 150 through a tunnel between branch 1 and cloud 150 to obtain the settings for establishing a tunnel between branch 1 and branch 2. Branch 2 can similarly communicate with cloud 150 through a tunnel between branch 2 and cloud 150 to obtain the settings for the tunnel between branch 1 and branch 2.

In some cases, cloud 150 can maintain information about each client network, in order to provide or support specific services for each client, such as network traffic monitoring, network traffic routing/re-routing, security, or VPN services. Cloud 150 can also maintain one or more links or tunnels to the clients. For example, cloud 150 can maintain a VPN tunnel to one or more devices in client A's network. In some cases, cloud 150 can configure the VPN tunnel for a client, maintain the VPN tunnel, or automatically update or establish any link or tunnel to the client or any devices of the client.

The cloud 150 can also monitor device and network health and status information for client A 110, client B 120, and client C 130. To this end, client A 110, client B 120, and client C 130 can synchronize information with cloud 150. Cloud 150 can also manage and deploy services for the clients. For example, cloud 150 can collect network information about client A 110 and generate network and device settings to automatically deploy a service for client A 110. In addition, cloud 150 can update device, network, and service settings for the clients.

Those skilled in the art will understand that the cloud architecture 150 can include any number of nodes, devices, links, networks, or components. In fact, embodiments with different numbers and/or types of clients, networks, nodes, cloud components, servers, software components, devices, virtual or physical resources, configurations, topologies, services, appliances, deployments, or network devices are also contemplated herein. Further, cloud 150 can include any number or types of resources, which can be accessed and utilized by clients or tenants. The illustration and examples provided herein are intended for clarification of some embodiments of the present technology.

Moreover, as far as communications, packets (e.g., traffic and/or messages) can be exchanged among the various nodes and networks in the cloud architecture 100 using specific network protocols. In particular, packets can be exchanged using wired protocols, wireless protocols, security protocols, OSI-Layer specific protocols, or any other protocols. Some non-limiting examples of protocols can include Session Initiation Protocol (SIP), protocols from the Internet Protocol Suite, such as TCP/IP; OSI (Open Systems Interconnection) protocols, such as L1-L7 protocols; routing protocols, such as RIP, IGP, BGP, STP, ARP, OSPF, EIGRP, NAT; or any other protocols or standards, such as HTTP, SSH, SSL, RTP, FTP, SMTP, POP, PPP, NNTP, IMAP, Telnet, SSL, SFTP, WIFI, Bluetooth, VTP, ISL, IEEE 802 standards, L2TP, IPSec, etc. In addition, various hardware and software components or devices can be implemented to facilitate communications both within a network and between networks. The various hardware and software components or devices can also be referred to as nodes and some examples are switches, hubs, routers, access points (APs), antennas, network interface cards (NICs), modules, cables, firewalls, servers, repeaters, sensors, and the like.

Figure 2:
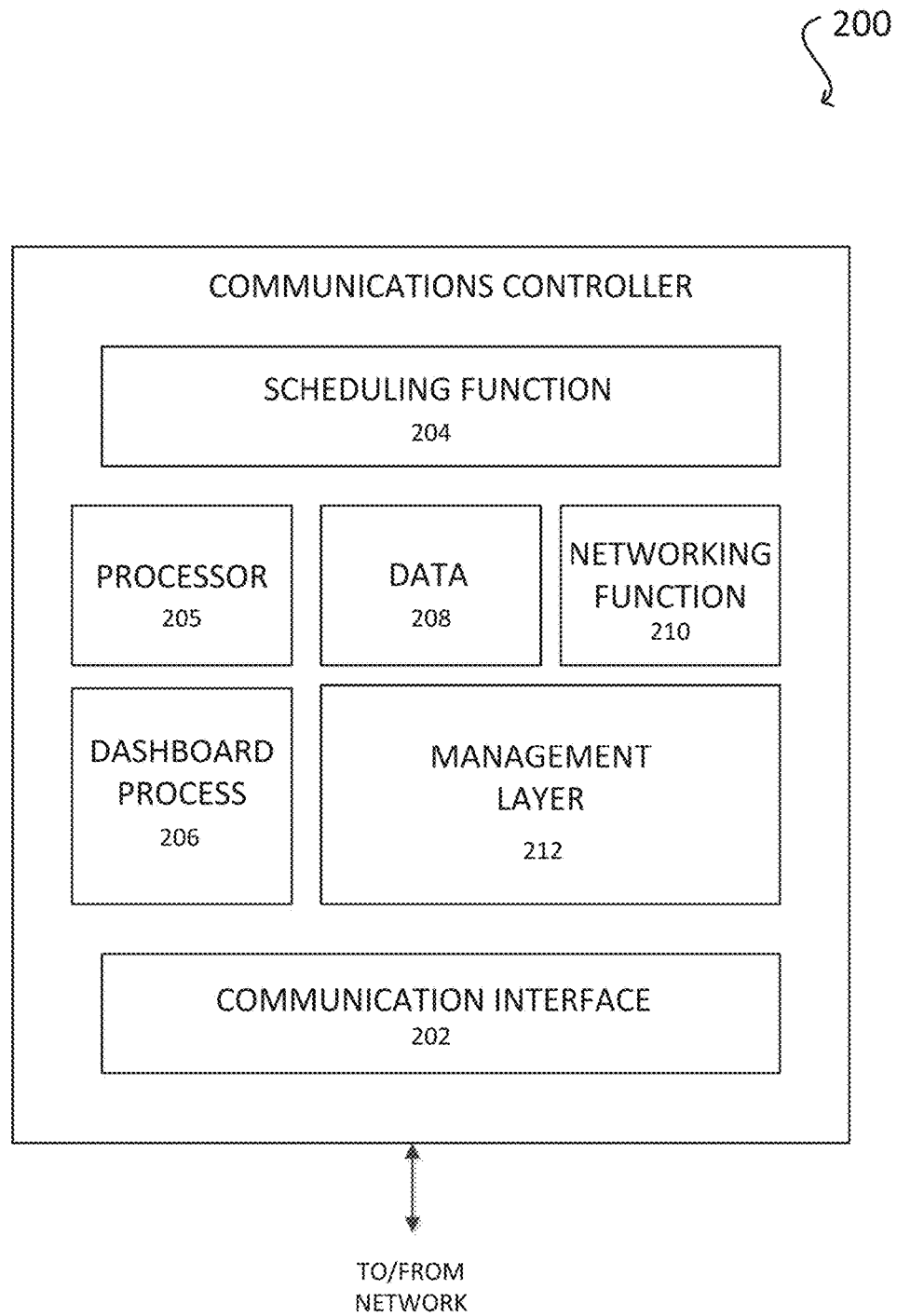
FIG. 2 illustrates an example cloud service management system.

FIG. 2 illustrates a schematic block diagram of an example communications controller 200. Communications controller 200 can serve as a cloud service management system for cloud 150. In particular, communications controller 200 can manage cloud operations, client communications, service provisioning, network configuration and monitoring, and the like. For example, communications controller 200 can manage cloud service provisioning, such as cloud storage, media, streaming, security, or administration services. In some embodiments, communications controller 200 can manage VMs; networks, such as client networks or software-defined networks (SDNs); service provisioning; and the like.

Communications controller 200 can include several subcomponents, including hardware and software components such as a scheduling function 204, a processor 205, a dashboard process 206, data 208, a networking function 210, a management layer 212, and a communication interface 202. The various subcomponents can be implemented as hardware and/or software components (e.g., processor 205, memory, data structures, etc.). Moreover, although FIG. 2 illustrates one example configuration of the various components of communications controller 200, those of skill in the art will understand that the components can be configured in a number of different ways and can include any other type and number of components. For example, networking function 210 and management layer 212 can belong to one software module or multiple separate modules. Other modules can be combined or further divided up into more subcomponents.

Scheduling function 204 can manage scheduling of procedures, events, or communications. For example, scheduling function 204 can schedule when resources should be allocated from cloud 150. As another example, scheduling function 204 can schedule when specific instructions or commands should be transmitted to the network (e.g., one or more client devices). In some cases, scheduling function 204 can provide scheduling for operations performed or executed by the various subcomponents of communications controller 200. Scheduling function 204 can also schedule resource slots, virtual machines, bandwidth, device activity, status changes, nodes, updates, and the like.

Dashboard process 206 can provide an interface or front end where clients can access, consume, and generally monitor cloud services. For example, dashboard process 206 can provide a web-based frontend where clients can configure client devices or networks that are cloud-managed, provide client preferences, specify policies, enter data, upload statistics, configure interactions or operations, etc. In some cases, dashboard process 206 can provide visibility information, such as views of client networks or devices, and even provide diagnostic information, discussed in greater detail below—e.g., dashboard process 206 can provide a view of the status or conditions of the client's network, the operations taking place, services, performance, a topology or layout, specific network devices, protocols implemented, running processes, errors, notifications, alerts, network structure, ongoing communications, data analysis, etc.

In some cases, dashboard process 206 can provide a graphical user interface (GUI) for the client to monitor the client network, the devices, statistics, errors, notifications, etc., and even make modifications or setting changes through the GUI. The GUI can depict charts, lists, tables, tiles, network trees, maps, topologies, symbols, structures, or any graphical object or element. In addition, the GUI can use color, font, shapes, or any other characteristics to depict scores, alerts, or conditions. In some cases, dashboard process 206 can also handle user or client requests. For example, the client can enter a service request through dashboard process 206.

Data 208 can include any data or information, such as management data, statistics, settings, preferences, profile data, logs, notifications, attributes, configuration parameters, client information, network information, and the like. For example, communications controller 200 can collect network statistics from the client and store the statistics as part of data 208. In some cases, data 208 can include performance and/or configuration information. This way, communications controller 200 can use data 208 to perform management or service operations for the client. Data 208 can be stored on a storage or memory device on communications controller 200, a separate storage device connected to communications controller 200, or a remote storage device in communication with communications controller 200.

Networking function 210 can perform networking calculations, such as network addressing, or networking service or operations, such as auto VPN configuration or traffic routing/re-routing. For example, networking function 210 can perform filtering functions, switching functions, failover functions, high availability functions, network or device deployment functions, resource allocation functions, messaging functions, traffic analysis functions, port configuration functions, mapping functions, packet manipulation functions, path calculation functions, loop detection, cost calculation, error detection, or otherwise manipulate data or networking devices. In some embodiments, networking function 210 can handle networking requests from other networks or devices and establish links between devices. In some embodiments, networking function 210 can perform queueing, messaging, or protocol operations.

Management layer 212 can include logic to perform management operations. For example, management layer 212 can include the logic to allow the various components of communications controller 200 to interface and work together. Management layer 212 can also include the logic, functions, software, and procedure to allow communications controller 200 to perform monitoring, management, control, and administration operations of other devices, cloud 150, the client, applications in cloud 150, services provided to the client, or any other component or procedure. Management layer 212 can include the logic to operate communications controller 200 and perform particular services configured on communications controller 200.

Moreover, management layer 212 can initiate, enable, or launch other instances in communications controller 200 and/or cloud 150. In some embodiments management layer 212 can also provide authentication and security services for cloud 150, the client, controller 200, and/or any other device or component. Further, management layer 212 can manage nodes, resources, VMs, settings, policies, protocols, communications, and the like. In some embodiments, management layer 212 and networking function 210 can be part of the same module. However, in some embodiments, management layer 212 and networking function 210 can be separate layers and/or modules.

Communications interface 202 allows communications controller 200 to communicate with the client, as well as any other device or network. Communications interface 202 can be a network interface card (NIC), and can include wired and/or wireless capabilities. Communications interface 202 allows communications controller 200 to send and receive data from other devices and networks. In some embodiments, communications controller 200 can include multiple communications interfaces for redundancy or failover. For example, communications controller 200 can include dual NICs for connection redundancy.

Figure 3:
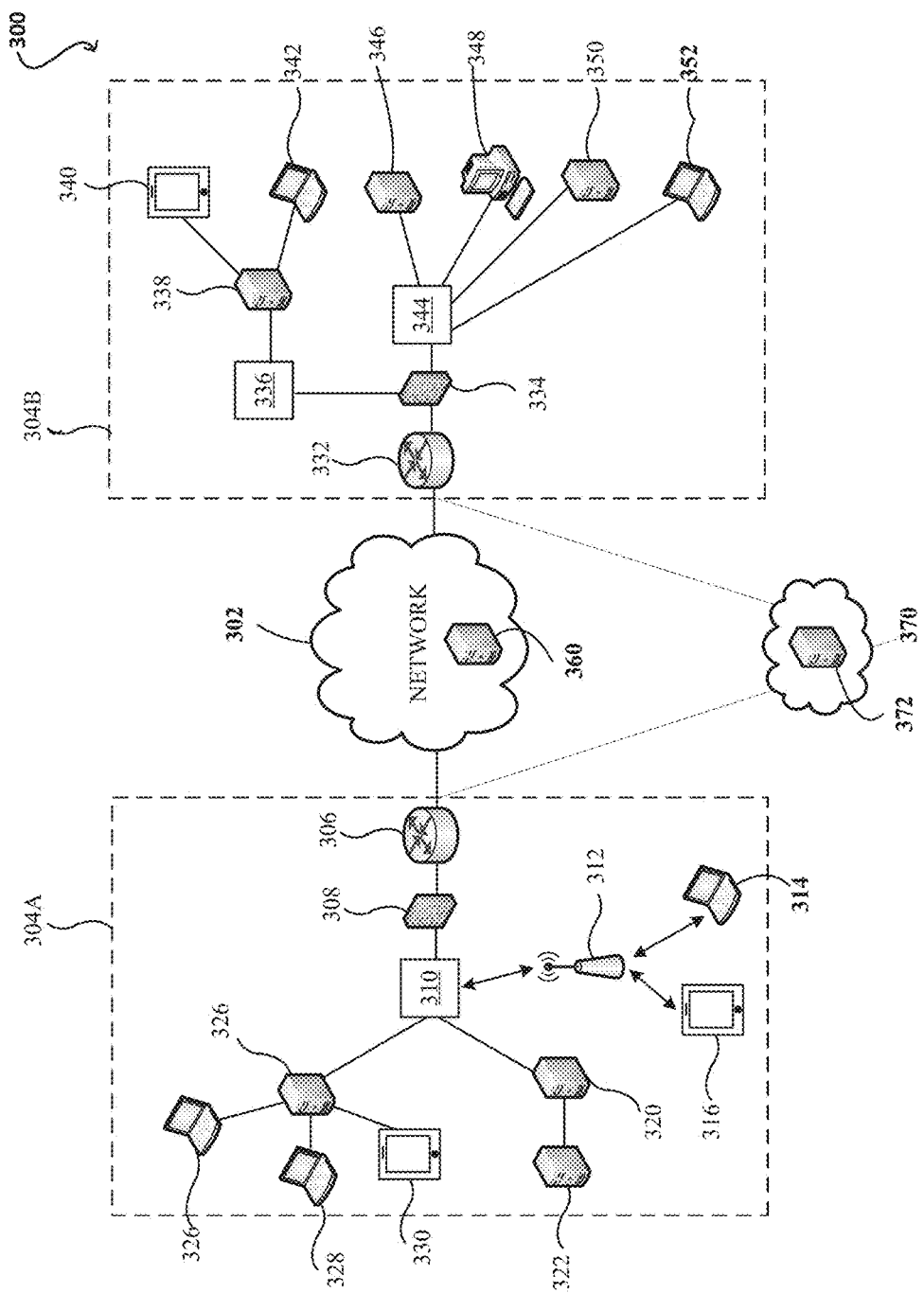
FIG. 3 illustrates an example network environment 300 which may utilize decentralized key distribution.

FIG. 3 illustrates an example network environment 300 which may utilize decentralized key distribution to increase privacy of endpoints (e.g., callers) in a conference call. The network environment 300 can include one or more networks, such as networks 304A and 304B. In some embodiments, endpoint callers may originate their communications from either network 304A or network 304B, using cloud based network 302 with cloud server 360 to communicate in a cloud-based environment. Networks 304A and 304B can include one or more local area networks (LANs), virtual LANs, wireless networks, physical network segments, logical network segments, underlay networks, overlay networks, etc. Each of the networks 304A and 304B can also include one or more physical and/or logical network segments. For example, networks 304A and 304B can be segmented into VLANs in order to separate traffic within the networks 304A and 304B. Moreover, networks 304A and 304B can be interconnected by network 302. Network 302 can include a cloud-based computing network, server 360, private network, such as a LAN, and/or a public network such as the Internet.

Networks 304A and 304B can include various devices 314, 316, 320, 322, 326, 328, 330, 338, 342, 346, 348, 350, 352, such as servers and client devices, interconnected via network devices 306-310, 312, 332-336, and 344, such as routers, firewalls, switches, and so forth. In some embodiments, networks 304A and 304B can be cloud-based networks themselves and may include clusters of nodes. Further, networks 304A and 304B and/or one or more nodes in networks 304A and 304B can be configured to provision network or application services, such as firewall services, content filtering services, application security services, web security services, bandwidth services, VPN services, web services, database services, remote access services, Internet services, and so forth.

Network 370 can be a cloud-based network with server 372. In some embodiments, server 372 may serve the role of identity provider for endpoints/callers that desire an authorization token to communicate with other endpoints/callers in a communication between the parties such as for communication in a conference call facilitated in cloud network 302 by cloud server 360.

In some embodiments, client device (endpoint) 314 of network 304A may desire communication with client device (endpoint) 352 of network 304B via cloud network 302. It is noted that endpoints 314 and 352 are shown as laptops, but may be represented by smartphones, desktop computers, tablets, and the like. Endpoint 314 and endpoint 352 may desire that their communications via network 302 be private in that their identities are not detectable by third parties operating in cloud network 302. Endpoints 314 and 352 may gain access to cloud conferencing server 360 by utilizing, for example, OAuth 2.0. Prior to communicating with each other via the MDD in the cloud conferencing server 360, both endpoints 314 and 352 may be authenticated with authorization server 372. Authorization server 372 can provide endpoints 314 and 352 with authorization tokens/certificates to access cloud conferencing server and MDD 360.

The tokens/certificates utilized by endpoints 314 and 352 for access to cloud conferencing server 360 may not list the identities of endpoints 314 and 352 such that a third party gaining unauthorized access to the tokens would not be able to determine the identities of endpoints 314 and 352. In some embodiments, the individual identities associated with endpoints 314 and 352 can be concealed in the tokens. The tokens/certificates can be obtained by endpoints 314 and 352 by communicating with the identity provider 372. In some embodiments, identity provider 372 may provide endpoints 314 and 352 with a short-term token/certificate, or a one-time use token. An authenticating party, for instance endpoint 314 or endpoint 352, can request that identity provider 372 generate a token/certificate that does not include the identity of the authenticating party. In some embodiments, short-term certificates and identity assertions can be changed for an endpoint for each call of a plurality of conference calls so that the cloud conferencing server cannot determine that the same endpoint is making multiple calls.

After endpoints 314 and 352 receive their authenticated tokens/certificates, each endpoint may attempt to access cloud network 302 by providing their authenticated tokens/certificates. In some embodiments, cloud server 360 and identity provider 372 may be in communication such that identity provider 372 provides cloud server 360 with a listing of tokens assigned to endpoints/callers that are authorized to access cloud network 302. Thus, in some embodiments, when endpoints 314 and 352 receive their authenticated tokens and short-term certificates, they may communicate with each other in cloud network 302 without cloud server 360 having access to their respective identities because cloud server 360 may only have information regarding authorized tokens and not the identities behind the authorized tokens/certificates. This can increase privacy among the communicating endpoints by preventing unauthorized parties from learning identifying information about the communicating endpoints. Further, this may prevent unauthorized parties from making inferences regarding the nature of the communications between the endpoint callers 314 and 352.

In some embodiments, identity provider 372 may create an identity assertion/token/certificate that disguises or omits the identity of the authenticated endpoint/caller. Thus, upon requesting access to cloud network 302 by, for example, an offer/answer procedure with cloud conferencing server 360, the authenticated endpoint/caller can provide an authenticated token from identity provider 372 that does not contain identifying information of the authenticated endpoint/caller. In some embodiments, upon requesting a token/certificate to enter a conference call hosted by cloud conferencing server 360, an authenticating endpoint/caller may provide identity provider 372 with information regarding the identities of other endpoints/callers that plan to join the conference call in cloud 302. The authenticating endpoint/caller may also provide identity provider 372 with a listing of other endpoints/callers authorized to receive the identity of the authenticating party. This can allow callers in cloud network 302 to confirm that the parties they are communicating with in cloud network 302 are the intended parties. In some embodiments, this can be achieved while withholding the identities of the communicating parties.

This may be accomplished by utilizing a decentralized key distribution procedure. In a decentralized key distribution system, an endpoint/caller may convey IP addresses and port numbers in an offer/answer procedure for communicating, for example, group keys with other callers in cloud network 302. This may provide for group key management by providing to the conference call participants associated group identifiers/keys.

In a decentralized key distribution system, an initiating endpoint/caller may test connectivity with remote peers (e.g., other endpoints/callers) by using, for example, Interactive Connectivity Establishment (ICE). The initiating endpoint may establish a secure connection with the remote peers/remote endpoints/remote callers, and the remote callers can mutually authenticate using, for example, short-term certificates provided by identity provider 372. This can be done by a relying party (e.g., a remote peer/caller desiring to join a conference call) validating their remote peer's certificate and assertion. The relying party can request identity provider 372 to provide the identity of an authenticated party (i.e., a remote peer on the same conference call). If the relying party is authorized to receive the identity of the authenticated party, the identity provider 372 may provide the identity of the authenticated party to the relying party. Identity provider 372 may determine parties authorized to receive identifying endpoint information by utilizing a list of authorized parties provided to it from the authenticating party.

The initiating endpoint/caller can generate a group identifier/group symmetric key (e.g., a group end-to-end encryption key) for encrypting and decrypting media exchanged between endpoints in a conference call hosted by cloud server 360. The initiating endpoint (e.g., a speaker of the conference call) can distribute the group symmetric key and encryption algorithm (e.g., Authenticated Encryption with Associated Data (AEAD) to the other participants/callers/endpoints in the conference call using a secure communication channel. In some embodiments, participants in the conference call can also establish a Datagram Transport Layer Security-Real-time Transport Protocol (DTLS-SRTP) session with cloud conferencing server 360 to generate a hop-by-hop key. The participants in the conference call may use a group end-to-end key to encrypt media transmitted in cloud network 302 to other participants in the conference call. The conference call participants may use the hop-by-hop key to encrypt RTP Control Protocol (RTCP) communications and calculate message integrity for Real-time Transport Protocol (RTP) headers. Thus, in some embodiments, cloud conferencing server 360 may not have access to encrypted real-time media in cloud 302 that is communicated between endpoints 314 and 352, but cloud conferencing server 360 may modify the RTP header associated with an encrypted communication.

The devices, nodes, and networks described in network environment 300 are non-limiting examples of devices, nodes, and networks provided for clarification purposes. One of ordinary skill in the art will readily recognize that network environment 300 can include more or less devices, nodes, and networks than those depicted in FIG. 3. Moreover, one of ordinary skill in the art will readily recognize that network environment 300 can include other configurations, architectures, topologies, and so forth. Indeed, other configurations, architectures, topologies, systems, and implementations are contemplated herein.

Figure 4:
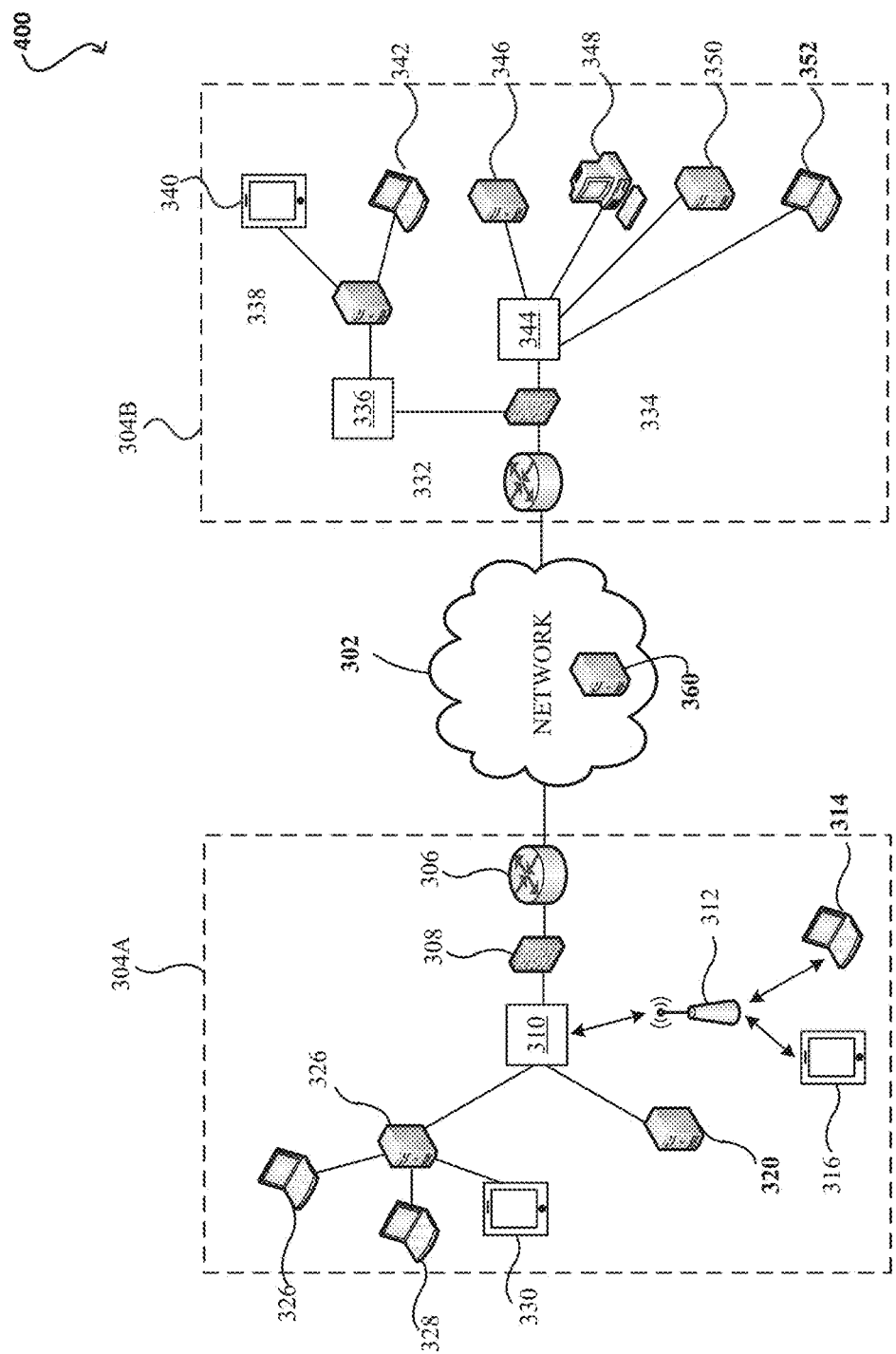
FIG. 4 illustrates an example network environment 400 which may utilize centralized key distribution.

FIG. 4 illustrates an example network environment 400 which may utilize centralized key distribution to increase privacy of endpoints (e.g., callers) in a conference call. The network environment 400 can include one or more networks, such as networks 304A and 304B. In some embodiments, endpoint callers may originate their communications from either network 304A or network 304B, using cloud based network 302 with cloud server 360 to communicate in a cloud-based environment. Networks 304A and 304B can include one or more local area networks (LANs), virtual LANs, wireless networks, physical network segments, logical network segments, underlay networks, overlay networks, etc. Each of the networks 304A and 304B can also include one or more physical and/or logical network segments. For example, networks 304A and 304B can be segmented into VLANs in order to separate traffic within the networks 304A and 304B. Moreover, networks 304A and 304B can be interconnected by network 302. Network 302 can include a cloud-based computing network, server 360, private network, such as a LAN, and/or a public network such as the Internet.

Networks 304A and 304B can include various devices 314, 316, 320, 326, 328, 330, 338, 342, 346, 348, 350, 352, such as servers and client devices, interconnected via network devices 306-310, 312, 332-336, and 344, such as routers, firewalls, switches, and so forth. In some embodiments, networks 304A and 304B can be cloud-based networks themselves and may include clusters of nodes. Further, networks 304A and 304B and/or one or more nodes in networks 304A and 304B can be configured to provision network or application services, such as firewall services, content filtering services, application security services, web security services, bandwidth services, VPN services, web services, database services, remote access services, Internet services, and so forth.

In some embodiments, server 320 may serve the role of identity provider and key management server (KMS) for endpoints/callers that desire an authorization token to communicate with other endpoints/callers in a communication between the parties such as for communication in a conference call facilitated in cloud network 302 by cloud conferencing server 360. KMS 320 can be an on-premise enterprise KMS that may securely create, share, rotate, and store group end-to-end encryption keys for securing media communicated between endpoints/callers in a conference call facilitated by cloud conferencing server 360 in cloud network 302. In some embodiments, endpoints in a conference call may communicate with KMS 320 directly or through cloud conference server 360. Thus, cloud conference server 360 may act as a transparent proxy that does not receive application layer (L7) data exchanged between endpoints/callers and KMS 320. Endpoints may authenticate with KMS 320 by using a token/certificate provided by the identity provider and identity assertion. The endpoint initiating a media request via cloud conference server 360 can request KMS 320 to generate a group encryption key and can negotiate an encryption algorithm. KMS 320 may also provide the identities of conference call participants that are authorized to receive the group keying material. Moreover, KMS 320 may use a push or pull model to provide the group keying material to the conference call participants.

In some embodiments that utilize centralized key distribution, client device (endpoint) 314 of network 304A may desire communication with client device (endpoint) 352 of network 304B via cloud network 302. It is noted that endpoints 314 and 352 are shown as laptops, but may be represented by smartphones, desktop computers, tablets, and the like. Endpoint 314 and endpoint 352 may desire that their communications via network 302 be private in that their identities are not detectable by third parties operating in cloud network 302. Endpoints 314 and 352 may gain access to cloud conferencing server 360 by utilizing, for example, OAuth 2.0. Prior to communicating with each other in via cloud conferencing server 360, both endpoints 314 and 352 may be authenticated with identity provider/KMS 320. Identity provider/KMS 320 can provide endpoints 314 and 352 with authorization tokens/certificates to access cloud conferencing server 360.

The tokens/certificates utilized by endpoints 314 and 352 for access to cloud conferencing server 360 may not list the identities of endpoints 314 and 352 such that a third party gaining unauthorized access to the tokens would not be able to determine the identities of endpoints 314 and 352. In some embodiments, the organizations associated with endpoints 314 and 352 can be concealed in the tokens. The tokens/certificates can be obtained by endpoints 314 and 352 by communicating with identity provider/KMS 320. In some embodiments, identity provider/KMS 320 may provide endpoints 314 and 352 with a short-term token/certificate, or a one-time use token. An authenticating party, for instance endpoint 314 or endpoint 352, can request that KMS 320 generate a token/certificate that does not include the identity of the authenticating party.

After endpoints 314 and 352 receive their authenticated tokens/certificates, each endpoint may attempt to access cloud conferencing server 360 by providing their authenticated certificates. In some embodiments, cloud conferencing server 360 and identity provider/KMS 320 may be in communication such that identity provider/KMS 320 provides cloud server 360 with a listing of tokens assigned to endpoints/callers that are authorized to access cloud conferencing server 360. Thus, in some embodiments, when endpoints 314 and 352 receive their authenticated tokens, they may communicate with each other in cloud network 302 without cloud conferencing server 360 having access to their respective identities because cloud server 360 may only have information regarding authorized tokens and not the identities behind the authorized tokens/certificates. This can increase privacy among the communicating endpoints by preventing unauthorized parties from learning identifying information about the communicating endpoints. Further, this may prevent unauthorized parties from making inferences regarding the nature of the communications between the endpoint callers 314 and 352.

In some embodiments, identity provider/KMS 320 may create an identity assertion/token/certificate that disguises or omits the identity of the authenticated endpoint/caller. Thus, upon requesting access to cloud network 302 by, for example, an offer/answer procedure with cloud conferencing server 360, the authenticated endpoint/caller can provide an authenticated token from identity provider/KMS 320 that does not contain identifying information of the authenticated endpoint/caller. In some embodiments, upon requesting a token/certificate to enter a conference call hosted by cloud conferencing server 360, an authenticating endpoint/caller may provide identity provider/KMS 320 with information regarding the identities of other endpoints/callers that plan to join the conference call in cloud 302. The authenticating endpoint/caller may also provide identity provider/KMS 320 with a listing of other endpoints/callers authorized to receive the identity of the authenticating party. This can allow callers in cloud network 302 to confirm that the parties they are communicating with in cloud network 302 are the intended parties. In some embodiments, this can be achieved while withholding the identities of the communicating parties.

The devices, nodes, and networks described in network environment 400 are non-limiting examples of devices, nodes, and networks provided for clarification purposes. One of ordinary skill in the art will readily recognize that network environment 400 can include more or less devices, nodes, and networks than those depicted in FIG. 4. Moreover, one of ordinary skill in the art will readily recognize that network environment 400 can include other configurations, architectures, topologies, and so forth. Indeed, other configurations, architectures, topologies, systems, and implementations are contemplated herein.

Figure 5:
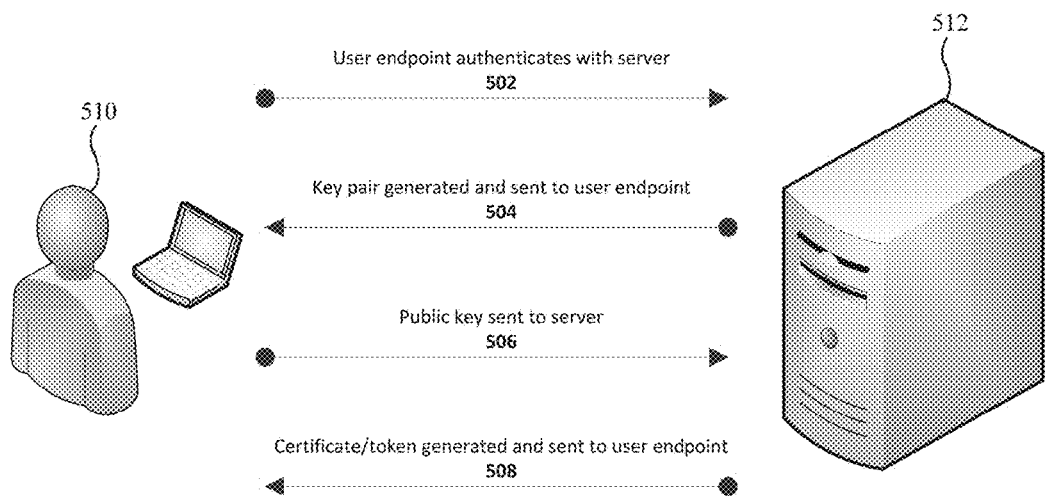
FIG. 5 illustrates an example embodiment of token generation.

FIG. 5 illustrates an example embodiment of token generation. A user 510 may utilize, for example, a laptop or other network computing device to receive an authenticated certificate/token that does not list the user's identification. This certificate/token may be used to access a cloud conference server (not shown) such that the user's identity is not known to the cloud conference server, but may be disclosed to other callers in the user's call conference by utilization of, for example, a group identifier. Server 512 may be an identity provider or key management server. Moreover, server 512 can function as an on-site enterprise key management server or as a remote server in a decentralized key distribution system. In FIG. 5, step 502 involves user 510 authenticating its identity with server 512. Authentication can occur through use of, for instance, a user name and password. Server 512 can generate key pairs at step 504 to send back to user 510. At step 506, a public key can be sent back to server 512. At step 508, server 512 may generate and sign the certificate/token and return the certificate/token to user 510. In some embodiments, the signed certificate/token may not include the identity of user 510 such that user 510 can utilize the signed certificate/token to access a cloud conference server without the cloud conference server knowing the identity of user 510 or the devices used by user 510 to access the cloud conference server.

Figure 6:
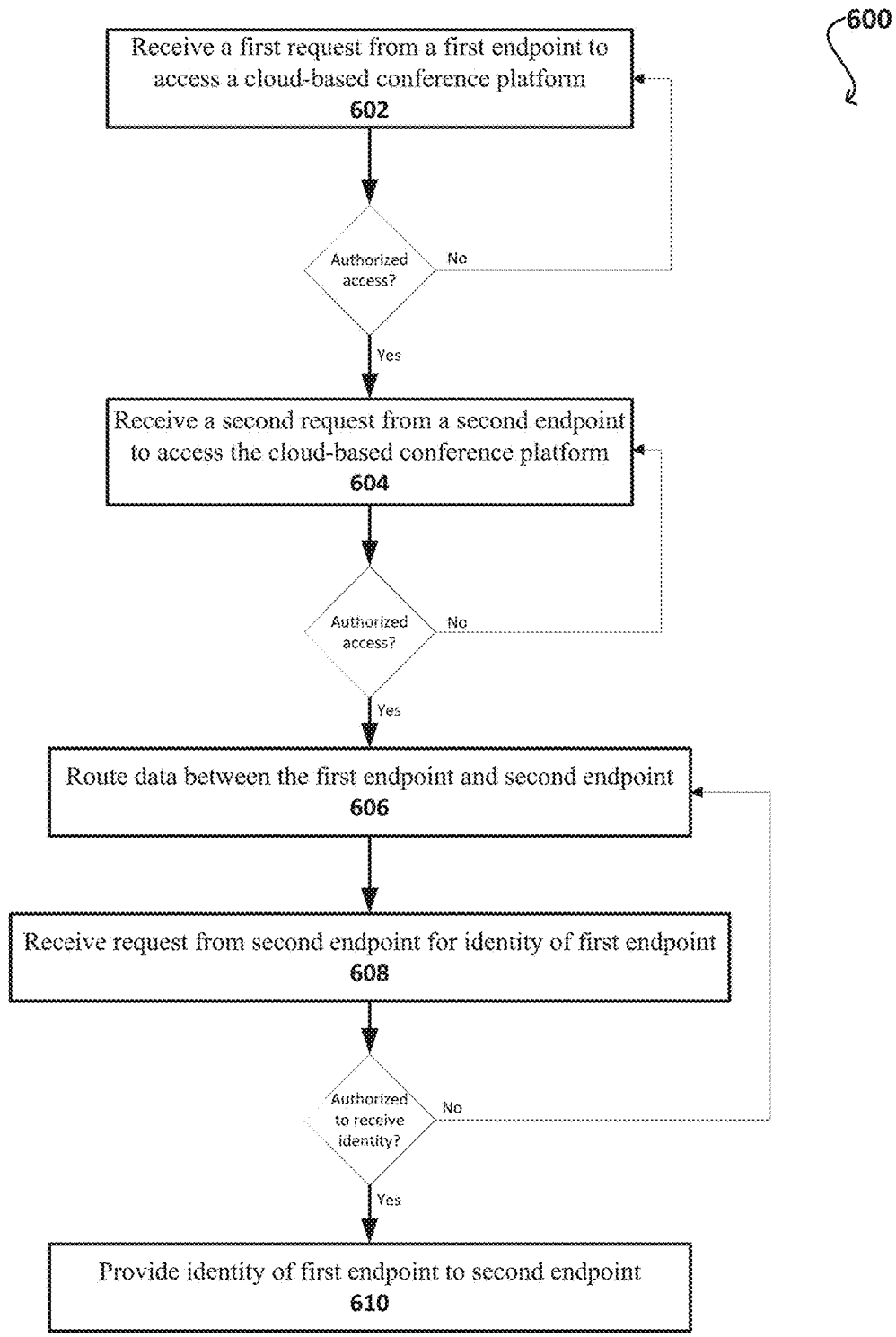
FIG. 6 illustrates an example procedure utilizing a decentralized key distribution.

FIG. 6 illustrates an example procedure 600 for endpoint privacy preservation with cloud conferencing according to one or more embodiments of the present disclosure. The steps outlined herein are exemplary and can be implemented in any combination thereof, including combinations that exclude, add, or modify steps shown in FIG. 6. At step 602, a first request can be received from a first endpoint to access a cloud-based conference platform, wherein the first request includes a first access token. Based at least on the first request, a first certificate can be provided to the first endpoint, wherein the first certificate does not include an identity of the first endpoint. If access to the cloud-based conference platform is authorized, procedure 600 may continue at step 604 wherein a second request may be received from a second endpoint to access the cloud-based conference platform, wherein the second request includes a second access token. Based at least on the second request, a second certificate can be provided to the second endpoint, wherein the second certificate does not include an identity of the second endpoint. If access to the cloud-based conference platform is authorized, procedure 600 may continue at step 606 wherein data can be routed within the cloud-based conference platform between the first endpoint and second endpoint using the MDD. Endpoints may authenticate with the MDD using, for example, a short-term certificate provided by the Enterprise IdP.

A listing of endpoints authorized to receive the identities of the other endpoints in the cloud-based conference platform that are communicating with each other may be provided to an identity provider. At step 608, a request may be received from the second endpoint for the identity of the first endpoint. If the second endpoint is authorized to receive the identity of the first endpoint (e.g., the second endpoint is one of the endpoints in the listing of endpoints authorized to receive the identity of the first endpoint), at step 610, the identity of the first endpoint can be provided to the second endpoint.

It should be noted that while certain steps within procedure 600 may be optional as described above, the steps shown in FIG. 6 are merely examples for illustration, and steps may be included or excluded as desired. Further, while a particular order of the steps is shown, this ordering is merely illustrative, and any suitable arrangement of the steps may be utilized without departing from the scope of the embodiments described herein.

Figure 7:
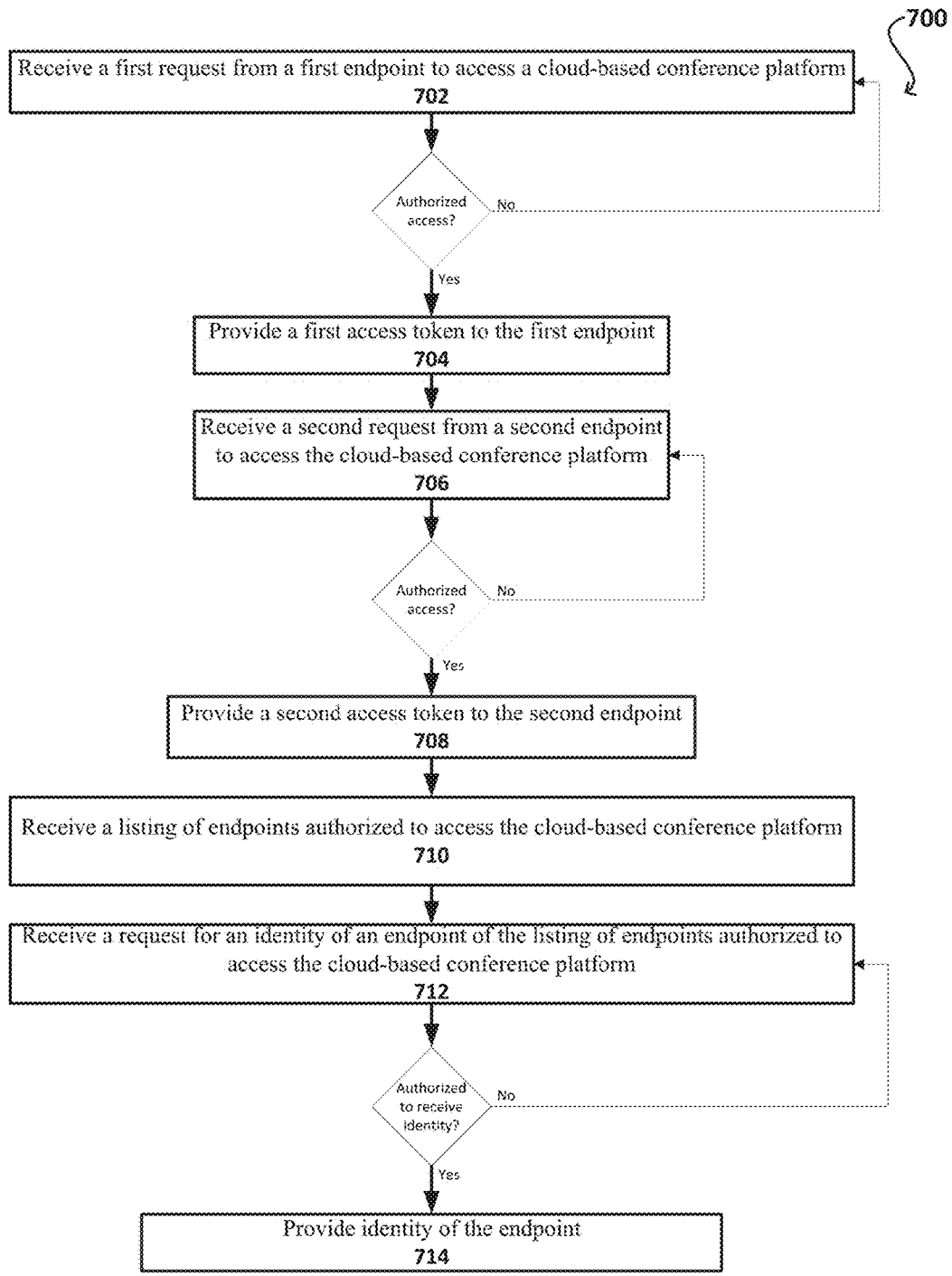
FIG. 7 illustrates an example procedure utilizing a centralized key distribution.

FIG. 7 illustrates an example procedure 700 for endpoint privacy preservation with cloud conferencing according to one or more embodiments of the present disclosure. The steps outlined herein are exemplary and can be implemented in any combination thereof, including combinations that exclude, add, or modify steps shown in FIG. 7. At step 702, a first request can be received from a first endpoint to access a cloud-based conference platform. If the first endpoint is authorized access to the cloud-based conference platform, procedure 700 can continue to step 704. In step 704, in response to the first request, a first access token can be provided to the first endpoint. Based at least on the first request, a first certificate can be provided to the first endpoint, wherein the first certificate does not include an identity of the first endpoint. Procedure 700 continues at step 706 wherein a second request may be received from a second endpoint to access the cloud-based conference platform. If the second endpoint is authorized access to the cloud-based conference platform, procedure 700 can continue to step 708. In step 708, in response to the second request, a second access token can be provided to the second endpoint and based at least on the second request, a second certificate may be provided to the second endpoint, wherein the second certificate does not include an identity of the second endpoint. The first endpoint and the second endpoint may communicate with each other in the cloud-based conference platform using at least the MDD. Endpoints can authenticate to the MDD using short-term certificates provided by the Enterprise Identity provider.

Procedure 700 may continue to step 710 wherein a listing of endpoints authorized to access the cloud-based conference platform can be received. In step 712, a request for an identity of an endpoint of the listing of endpoints authorized to access the cloud-based conference platform can be received. If the requesting endpoint is authorized to receive the requested identity, procedure 700 may continue to step 714 wherein the identity of the requested endpoint is provided to the requesting endpoint.

It should be noted that while certain steps within procedure 700 may be optional as described above, the steps shown in FIG. 7 are merely examples for illustration, and steps may be included or excluded as desired. Further, while a particular order of the steps is shown, this ordering is merely illustrative, and any suitable arrangement of the steps may be utilized without departing from the scope of the embodiments described herein.

Figure 8:
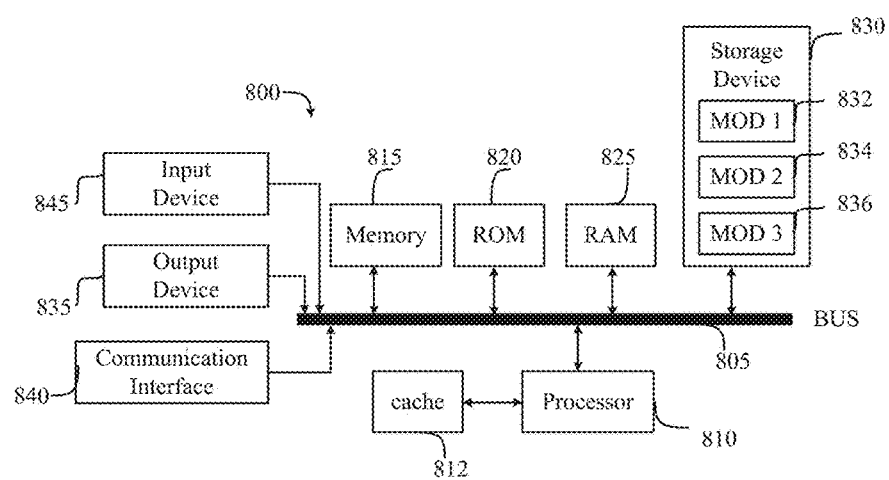
FIG. 8 illustrates an example architecture of some embodiments of the present technology.

FIG. 8 illustrates an example system architecture of some embodiments of the present technology. Persons of ordinary skill in the art will also readily appreciate that other system embodiments are possible.

FIG. 8 illustrates a conventional bus computing system architecture 800 wherein the components of the system are in electrical communication with each other using a bus 805. Exemplary system 800 includes a processing unit (CPU or processor) 810 and a system bus 805 that couples various system components including the system memory 815, such as read only memory (ROM) 820 and random access memory (RAM) 825, to the processor 810. The system 800 can include a cache of high-speed memory connected directly with, in close proximity to, or integrated as part of the processor 810. The system 800 can copy data from the memory 815 and/or the storage device 830 to the cache 812 for quick access by the processor 810. In this way, the cache can provide a performance boost that avoids processor 810 delays while waiting for data. These and other modules can control or be configured to control the processor 810 to perform various actions. Other system memory 815 may be available for use as well. The memory 815 can include multiple different types of memory with different performance characteristics. The processor 810 can include any general purpose processor and a hardware module or software module, such as module 1 832, module 2 834, and module 3 836 stored in storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction with the computing system architecture 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing device 800. The communications interface 840 can generally govern and manage the user input and system output. There is no restriction on operating on any particular hardware arrangement and therefore the basic features here may easily be substituted for improved hardware or firmware arrangements as they are developed.

Storage device 830 can be a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof.

The storage device 830 can include software modules 832, 834, 836 for controlling the processor 810. Other hardware or software modules are contemplated. The storage device 830 can be connected to the system bus 805. In one aspect, a hardware module that performs a particular function can include the software component stored in a computer-readable medium in connection with the necessary hardware components, such as the processor 810, bus 805, display 835, and so forth, to carry out the function.

It can be appreciated that example system 800 can have more than one processor 810 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, media, and memories can include a cable or wireless signal containing a bit stream and the like. However, when mentioned, non-transitory computer-readable storage media exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rack mount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim. Further, features described with reference to an embodiment disclosed herein can be combined with, or implemented in, any other embodiments disclosed herein.

The techniques disclosed herein can provide increased privacy among endpoints communicating via a cloud-based network which may result in more efficient network packet processing as fewer data may be required for network packet transmissions, which may result in fewer processor cycles required to route signals and thus improved efficiency of the network processors used to implement some embodiments of the present technology.

While there have been shown and described illustrative embodiments of the present technology, it is to be understood that various other adaptations and modifications may be made within the spirit and scope of the embodiments herein. For example, the embodiments have been shown and described herein with relation to a particular communication system. However, the embodiments in their broader sense are not as limited, and may, in fact, be used with any number of communication systems.

Further, although the foregoing description has been directed to specific embodiments, it will be apparent that other variations and modifications may be made to the described embodiments, with the attainment of some or all of their advantages. For instance, it is expressly contemplated that the components and/or elements described herein can be implemented as software being stored on a tangible (non-transitory) computer-readable medium, devices, and memories (e.g., disks/CDs/RAM/EEPROM/ etc.) having program instructions executing on a computer, hardware, firmware, or a combination thereof. Further, methods describing the various functions and techniques described herein can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code.

Examples of computer-readable media that may be used to store instructions, information used, and/or information created during methods according to described examples include cloud-based media, magnetic or optical disks, flash memory, USB devices provided with non-volatile memory, networked storage devices, and the like. In addition, devices implementing methods according to these disclosures can comprise hardware, firmware and/or software, and can take any of a variety of form factors. Typical examples of such form factors include laptops, smart phones, tablets, wearable devices, small form factor personal computers, personal digital assistants, and the like. Functionality described herein also can be embodied in peripherals or add-in cards. Such functionality can also be implemented on a circuit board among different chips or different processes executing in a single device, by way of further example. Instructions, media for conveying such instructions, computing resources for executing them, and other structures for supporting such computing resources are means for providing the functions described in these disclosures. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A non-transitory computer-readable medium including instructions stored thereon, the instructions, when executed by a processor, cause the processor to:
   receive a first request from a first endpoint to access a cloud-based conference platform, wherein the first request includes a first access token;
   based at least on the first request, provide a first certificate to the first endpoint, wherein the first certificate does not include an identity of the first endpoint;
   receive a second request from a second endpoint to access the cloud-based conference platform, wherein the second request includes a second access token;
   based at least on the second request, provide a second certificate to the second endpoint, wherein the second certificate does not include an identity of the second endpoint;
   route data within the cloud-based conference platform between the first endpoint and the second endpoint based at least on the first certificate and the second certificate;

receive, via an identity provider, a third request for an identity of one of the first endpoint or the second endpoint, the third request sent from another one of the first endpoint or the second endpoint; and provide, via the identity provider, the identity of the one of the first endpoint or the second endpoint unless the one of the first endpoint or the second endpoint has not authorized the identity provider to provide the identity of the one of the first endpoint or the second endpoint.

2. The non-transitory computer-readable medium of claim 1, wherein access tokens provide at least one of temporary access or one-time access to the cloud-based conference platform.

3. The non-transitory computer-readable medium of claim 1, wherein access tokens are provided by the identity provider hosted by an enterprise network associated with the first endpoint.

4. The non-transitory computer-readable medium of claim 1, wherein the identity provider provides access tokens and is hosted by a separate network from the first endpoint and the second endpoint.

5. The non-transitory computer-readable medium of claim 1,
wherein,
the instructions further cause the processor to receive, via the identity provider, a listing of endpoints,
the listing of endpoints is sent from the first endpoint,
the listing of endpoints includes all endpoints authorized to receive the identity of the first endpoint, and
the listing of endpoints includes at least the second endpoint.

6. The non-transitory computer-readable medium of claim 1,
wherein,
the third request is for the identity of the first endpoint,
the third request is sent from the second endpoint, and
the second endpoint is included in a listing of endpoints authorized to receive the identity of the first endpoint.

7. A non-transitory computer-readable medium including instructions stored thereon, the instructions, when executed by a processor, cause the processor to:
receive a first request from a first endpoint to access a cloud-based conference platform;
in response to the first request, provide a first access token to the first endpoint;
based at least on the first request, provide a first certificate to the first endpoint, wherein the first certificate does not include an identity of the first endpoint;
receive a second request from a second endpoint to access the cloud-based conference platform;
in response to the second request, provide a second access token to the second endpoint;
based at least on the second request, provide a second certificate to the second endpoint;
receive a third request from the second endpoint for the identity of the first endpoint; and
in response to the third request, provide the identity of the first endpoint based at least upon a listing of endpoints authorized to access the cloud-based conference platform and to receive identifying information,
wherein,
the second certificate does not include an identity of the second endpoint, and
the first endpoint and the second endpoint communicate with each other in the cloud-based conference platform using at least the first certificate and the second certificate.

8. The non-transitory computer-readable medium of claim 7,
wherein
the instructions further cause the processor to receive the listing of endpoints,
the listing of endpoints is sent from the first endpoint,
the listing of endpoints includes all endpoints authorized to receive the identity of the first endpoint, and
the listing of endpoints includes the second endpoint.

9. The non-transitory computer-readable medium of claim 7,
wherein,
the third request is for the identity of the first endpoint,
the third request is sent from the second endpoint, and
the second endpoint is included in the listing of endpoints.

10. The non-transitory computer-readable medium of claim 7, wherein access tokens provide at least one of temporary access or one-time access to the cloud-based conference platform.

11. The non-transitory computer-readable medium of claim 7, wherein access tokens are provided by an identity provider hosted by an enterprise network associated with the first endpoint.

12. The non-transitory computer-readable medium of claim 7, wherein access tokens are provided by an identity provider hosted by a separate network from the first endpoint and the second endpoint.

13. A system comprising:
one or more processors;
an identity provider; and
a memory configured to store a process, the process, when executed by the one or more processors, causes the one or more processors to:
receive a first request from a first endpoint of a first network to access a cloud-based conference platform in a cloud network, wherein the first request includes a first access token;
based at least on the first request, provide a first certificate to the first endpoint, wherein the first certificate does not include an identity of the first endpoint;
receive a second request from a second endpoint of a second network to access the cloud-based conference platform in the cloud network, wherein the second request includes a second access token;
based at least on the second request, provide a second certificate to the second endpoint, wherein the second certificate does not include an identity of the second endpoint;
route data within the cloud-based conference platform of the cloud network between the first endpoint and the second endpoint based at least on the first certificate and the second certificate;
receive, via the identity provider proxy, a third request for an identity of one of the first endpoint or the second endpoint, the third request sent from another one of the first endpoint or the second endpoint; and
provide, via the identity provider, the identity of the one of the first endpoint or the second endpoint unless the one of the first endpoint or the second endpoint has not authorized the identity provider to provide the identity of the one of the first endpoint or the second endpoint.

14. The system of claim 13, wherein access tokens provide at least one of temporary access or one-time access to the cloud-based conference platform of the cloud network.

15. The system of claim 13, wherein the identity provider provides access tokens and is hosted by a third network.

16. The system of claim 13,
wherein,
the process further causes the one or more processors to receive, via the identity provider, a listing of endpoints,
the listing of endpoints is sent from the first endpoint,
the listing of endpoints includes all endpoints authorized to receive the identity of the first endpoint, and
the listing of endpoints includes at least the second endpoint.

17. The system of claim 13,
wherein,
the third request is for the identity of the first endpoint,
the third request is sent from the second endpoint, and
the second endpoint is included in a listing of endpoints authorized to receive the identity of the first endpoint.

18. A method comprising:
receiving a first request from a first endpoint to access a cloud-based conference platform, wherein the first request includes a first access token;
based at least on the first request, providing a first certificate to the first endpoint, wherein the first certificate does not include an identity of the first endpoint;
receiving a second request from a second endpoint to access the cloud-based conference platform, wherein the second request includes a second access token;
based at least on the second request, providing a second certificate to the second endpoint, wherein the second certificate does not include an identity of the second endpoint;
routing data within the cloud-based conference platform between the first endpoint and the second endpoint based at least on the first certificate and the second certificate,
receiving, via an identity provider, a third request for an identity of one of the first endpoint or the second endpoint, the third request sent from another one of the first endpoint or the second endpoint; and
providing, via the identity provider, the identity of the one of the first endpoint or the second endpoint unless the one of the first endpoint or the second endpoint has not authorized the identity provider to provide the identity of the one of the first endpoint or the second endpoint.

19. The method of claim 18, wherein access tokens are provided by the identity provider hosted by an enterprise network associated with the first endpoint.

20. The method of claim 18, wherein the identity provider provides access tokens and is hosted by a separate network from the first endpoint and the second endpoint.

* * * * *